United States Patent
Jeong et al.

(10) Patent No.: US 12,355,319 B2
(45) Date of Patent: Jul. 8, 2025

(54) DRIVING UNIT AND LINEAR COMPRESSOR INCLUDING THE SAME

(71) Applicant: LG Electronics Inc., Seoul (KR)

(72) Inventors: Sangsub Jeong, Seoul (KR); Sungchul Gong, Seoul (KR); Jaehoon Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 18/094,682

(22) Filed: Jan. 9, 2023

(65) Prior Publication Data

US 2023/0336061 A1    Oct. 19, 2023

(30) Foreign Application Priority Data

Apr. 14, 2022   (KR) ................... 10-2022-0046224

(51) Int. Cl.
*H02K 16/04*   (2006.01)
*H02K 3/52*   (2006.01)
*F25B 31/02*   (2006.01)

(52) U.S. Cl.
CPC ............. *H02K 16/04* (2013.01); *H02K 3/525* (2013.01); *F25B 31/023* (2013.01); *H02K 2203/12* (2013.01)

(58) Field of Classification Search
CPC .... H02K 3/525; H02K 16/04; H02K 2203/12; F25B 31/023
USPC .......................................... 310/114
See application file for complete search history.

(56) References Cited

U.S. PATENT DOCUMENTS

| 12,228,120 B2* | 2/2025 | Kim .................... F04B 39/0061 |
| 2004/0093873 A1 | 5/2004 | Ogura |
| 2005/0017593 A1 | 1/2005 | Suzuki |
| 2016/0017873 A1 | 1/2016 | Byun et al. |
| 2019/0234391 A1* | 8/2019 | Noh ........................ F04B 39/12 |
| 2020/0003198 A1* | 1/2020 | Noh .................... F04B 39/0061 |
| 2020/0003200 A1* | 1/2020 | Noh ..................... F04B 39/125 |
| 2020/0018302 A1* | 1/2020 | Kim ....................... F04B 19/04 |
| 2021/0054832 A1* | 2/2021 | Noh ..................... F25B 31/023 |
| 2021/0054833 A1* | 2/2021 | Lee .......................... F25B 1/02 |
| 2021/0095653 A1* | 4/2021 | Kim ..................... F04B 39/122 |

(Continued)

FOREIGN PATENT DOCUMENTS

| JP | 1997-195938 | 7/1997 |
| KR | 20090095113 | 9/2009 |
| KR | 10-2017-0119592 | 10/2017 |

OTHER PUBLICATIONS

Extended European Search Report in European Appln. No. 23155063.3, mailed on Oct. 25, 2023, 5 pages.

(Continued)

*Primary Examiner* — Rashad H Johnson
(74) *Attorney, Agent, or Firm* — Fish & Richardson P.C.

(57) ABSTRACT

A driving unit and a linear compressor including the same are provided. The driving unit includes an inner stator, a bobbin surrounding the inner stator in a circumferential direction, a coil wound on the bobbin, a plurality of stator cores surrounding the bobbin and spaced apart from each other in the circumferential direction, and a plurality of permanent magnets disposed between the inner stator and the plurality of stator cores. A cross section of the bobbin may include a pair of straight portions facing each other and a curved portion connecting the pair of straight portions.

20 Claims, 16 Drawing Sheets

(56) References Cited

U.S. PATENT DOCUMENTS

| | | | |
|---|---|---|---|
| 2021/0108628 A1* | 4/2021 | Lee | F04B 39/121 |
| 2021/0108837 A1* | 4/2021 | Son | F04B 39/16 |
| 2021/0123424 A1* | 4/2021 | Son | F04B 35/045 |
| 2021/0123428 A1* | 4/2021 | Son | F04B 39/126 |
| 2021/0140424 A1* | 5/2021 | Jeon | F04B 53/162 |
| 2021/0140425 A1* | 5/2021 | Kim | F04B 53/14 |
| 2021/0396224 A1* | 12/2021 | Bae | F04B 39/0005 |
| 2022/0018344 A1* | 1/2022 | Song | F04B 53/14 |
| 2022/0065238 A1* | 3/2022 | Jeong | F04B 35/045 |
| 2022/0069689 A1* | 3/2022 | Kim | H02K 33/16 |
| 2022/0090590 A1* | 3/2022 | Son | F04B 39/0292 |
| 2022/0090591 A1* | 3/2022 | Son | F04B 53/14 |
| 2022/0140719 A1* | 5/2022 | Kim | H02K 16/04 417/415 |
| 2022/0154708 A1* | 5/2022 | Kim | H02K 33/16 |
| 2022/0170450 A1* | 6/2022 | Gong | F04B 39/125 |
| 2022/0170475 A1* | 6/2022 | Park | F04B 39/0246 |
| 2022/0178361 A1* | 6/2022 | Jeon | F04B 35/045 |
| 2022/0196010 A1* | 6/2022 | Noh | F04B 39/121 |
| 2023/0175497 A1* | 6/2023 | Noh | F04B 39/06 417/437 |
| 2023/0258166 A1* | 8/2023 | Kim | H02K 41/02 417/416 |
| 2023/0332588 A1* | 10/2023 | Jeon | F16F 9/0427 |
| 2024/0035460 A1* | 2/2024 | Noh | F04B 39/12 |
| 2024/0102459 A1* | 3/2024 | Jung | F04B 39/125 |
| 2024/0110553 A1* | 4/2024 | Song | F04B 39/0061 |
| 2024/0110554 A1* | 4/2024 | Roh | F04B 35/045 |
| 2024/0110556 A1* | 4/2024 | Kim | F04B 39/0061 |
| 2024/0110557 A1* | 4/2024 | Kim | F04B 39/0061 |

OTHER PUBLICATIONS

Office Action in Korean Appln. No. 10-2022-0046224, mailed on Jul. 5, 2023, 12 pages (with English translation).

\* cited by examiner

| Side force | Comparative Example 2 | | Second embodiment | | Third embodiment | | Comparative Example 3 | |
|---|---|---|---|---|---|---|---|---|
| | X | Y | X | Y | X | Y | X | Y |
| Eccentricity 0 | 0.01 N | 0.09 N | -0.05 N | -0.09 N | -0.05 N | 0.02 N | 0.01 N | 10.4 N |
| X Eccentricity 50 μm | 6.12 N | | 6.00 N | | 6.06 N | | | |
| Y Eccentricity 50 μm | | 6.16 N | | 4.25 N | | 3.98 N | | |
| XY Eccentricity 50 μm | 6.25 N | 6.21 N | 6.06 N | 4.34 N | 6.10 N | 4.17 N | | |

DRIVING UNIT AND LINEAR COMPRESSOR INCLUDING THE SAME

CROSS-REFERENCE TO RELATED APPLICATION

This application claims priority to and the benefit of Korean Patent Application No. 10-2022-0046224, filed in the Korean Intellectual Property Office on Apr. 14, 2022, the entire contents of which are incorporated herein by reference.

TECHNICAL FIELD

The present disclosure relates to a driving unit and a linear compressor including the same.

BACKGROUND

In general, a compressor refers to a device configured to compress a working fluid such as air or refrigerant by receiving power from a power generating device such as a motor or a turbine. Specifically, the compressor is widely applied to the overall industry or home appliances, in particular, a vapor compression type refrigeration cycle and the like (hereinafter referred to as a 'refrigeration cycle').

Such a compressor may be divided into a reciprocating compressor, a rotary compressor, and a scroll compressor according to a method of compressing a refrigerant.

The reciprocating compressor is a method in which a compression space is formed between a piston and a cylinder and the piston is linearly reciprocated to compress a fluid, the rotary compressor is a method of compressing a fluid by a roller eccentrically rotated inside the cylinder, and the scroll compressor is a method of compressing a fluid by rotating a pair of spiral scrolls engaged with each other.

Recently, the use of a linear compressor using a linear reciprocating motion without using a crankshaft among reciprocating compressors is gradually increasing. The linear compressor has advantages in that the efficiency of the compressor is improved because the mechanical loss involved in converting the rotational motion into the linear reciprocating motion is small, and the structure is relatively simple.

The linear compressor is configured such that a cylinder is positioned inside a casing forming a closed space to form a compression chamber, and a piston covering the compression chamber reciprocates inside the cylinder. In the linear compressor, processes in which the fluid in the closed space is sucked into the compression chamber when the piston is positioned at the bottom dead center (BDC), and the fluid in the compression chamber is compressed and discharged when the piston is positioned at the top dead center (TDC) are repeated.

A compression unit and a driving unit are installed inside the linear compressor, respectively, and through the movement generated in the driving unit, the compression unit performs a process of compressing and discharging the refrigerant while resonating by a resonance spring.

The piston of the linear compressor sucks the refrigerant into the inside of the casing through the suction pipe while reciprocating at high speed inside the cylinder by the resonance spring, and then repeatedly performs a series of processes of being discharged from the compression space by the forward movement of the piston and moving to the condenser through the discharge pipe.

On the other hand, the linear compressor may be divided into an oil lubrication type linear compressor and a gas type linear compressor according to a lubrication method.

The oil lubrication type linear compressor is configured to store a certain amount of oil inside the casing and lubricate between the cylinder and the piston using the oil.

On the other hand, the gas lubrication type linear compressor is configured to induce a portion of the refrigerant discharged from the compression space between the cylinder and the piston and lubricate between the cylinder and the piston with the gas force of the refrigerant without storing oil inside the casing.

The oil lubrication type linear compressor may suppress overheating of the cylinder and the piston by motor heat or compression heat, etc. as oil having a relatively low temperature is supplied between the cylinder and the piston. Through this, the oil lubrication type linear compressor may suppress an increase in specific volume since the refrigerant passing through the suction passage of the piston is heated while being sucked into the compression chamber of the cylinder, thereby preventing suction loss in advance.

Recently, needs for a subminiature linear compressor is increasing. To this end, the size of the linear motor (driving unit) must be reduced.

Simply, when the size of the linear motor is reduced, there is a problem in that the output of the linear motor is reduced.

In addition, there is a problem in that the distance between the plurality of stator cores or the plurality of core blocks of the outer stator is reduced, and interference with other components occurs.

SUMMARY

An object to be solved by the present disclosure is to provide a driving unit capable of reducing the overall size of a linear compressor by reducing the size of the driving unit, and a linear compressor including the same.

In addition, an object to be solved by the present disclosure is to provide a driving unit capable of reducing the overall height of a linear compressor by reducing the height of the driving unit, and a linear compressor including the same.

In addition, an object to be solved by the present disclosure is to provide a driving unit capable of maintaining a stable output of the driving unit while reducing the height of the driving unit, and a linear compressor including the same.

In addition, an object to be solved by the present disclosure is to provide a driving unit capable of reducing cost by reducing, the configuration of the driving unit while maintaining a stable output of the driving unit, and a linear compressor including the same.

In addition, an object to be solved by the present disclosure is to provide a driving unit capable of reducing interference between an oil feeder and a plurality of stator cores while reducing the size of the driving unit, and a linear compressor including the same.

In addition, an object to be solved by the present disclosure is to provide a driving unit capable of reducing interference between a terminal portion and a plurality of stator cores while reducing the size of the driving unit, and a linear compressor including the same.

In addition, an object to be solved by the present disclosure is to provide a driving unit capable of maintaining the overall balance of a linear compressor while reducing the size of the driving unit, and a linear compressor including the same.

In addition, an object to be solved by the present disclosure is to provide a driving unit capable of improving the manufacturing efficiency of the driving unit, and a linear compressor including the same since the position of the permanent magnet and the position of the plurality of stator cores can be determined according to the position of the magnet coupling hole of the magnet frame.

In addition, an object to be solved by the present disclosure is to provide a driving unit capable of improving the manufacturing efficiency of the driving unit, and a linear compressor including the same since the position of the permanent magnet and the position of the plurality of stator cores can be determined according to the position of the supporter coupling hole of the spring supporter.

A driving unit according to an aspect of the present disclosure for achieving the above object may comprise an inner stator, a bobbin surrounding the inner stator in a circumferential direction, a coil wound on the bobbin, a plurality of stator cores surrounding the bobbin and spaced apart from each other in the circumferential direction, and a plurality of permanent magnets disposed between the inner stator and the plurality of stator cores.

In this case, a cross section of the bobbin may include a pair of straight portions facing each other and a curved portion connecting the pair of straight portions.

Through this, it is possible to reduce the overall size of the linear compressor by reducing the size of the driving unit.

In addition, the pair of straight portions may be formed in an upper region and a lower region of the bobbin. In this case, the plurality of stator cores may be disposed only on the curved portion.

Through this, it is possible to reduce the overall height of the linear compressor by reducing the height of the driving unit.

In addition, the plurality of stator cores may include first to sixth stator cores spaced apart from each other in the circumferential direction, an angle between a straight line passing through a center of the first stator e and a center of the inner stator and a straight line passing through a center of the second stator core and the center of the inner stator may be 45 degrees, an angle between the straight line passing through the center of the second stator core and the center of the inner stator and a straight line passing through a center of the third stator core and the center of the inner stator may be 45 degrees, an angle between the straight line passing through the center of the third stator core and the center of the inner stator and a straight line passing through a center of the fourth stator core and the center of the inner stator may be 90 degrees, an angle between the straight line passing through the center of the fourth stator core and the center of the inner stator and a straight line passing through a center of the fifth stator core and the center of the inner stator may be 45 degrees, an angle between the straight line passing through the center of the fifth stator core and the center of the inner stator and a straight line passing through a center of the sixth stator core and the center of the inner stator may be 45 degrees, and an angle between the straight line passing through the center of the sixth stator core and the center of the inner stator and the straight line passing through the center of the first stator core and the center of the inner stator may be 90 degrees.

In this case, the plurality of permanent magnets may include first to twelfth permanent magnets spaced apart from each other at the same distance in the circumferential direction, the first and seventh permanent magnets facing each other may face the straight portion, and a central region of the second to sixth permanent magnets and a central region of the eighth to twelfth permanent magnets may face the curved portion.

Through this, it is possible to maintain a stable output of the driving unit while reducing the height of the driving unit.

In addition, the plurality of permanent magnets may include first to tenth permanent magnets spaced apart from each other in the circumferential direction, and a central region of the first to tenth permanent magnets facing each other may face the curved portion.

In this case, an angle between straight lines passing through a center of the first to fifth permanent magnets and a center of the inner stator may be each 30 degrees, an angle between a straight line passing through a center of the sixth permanent magnet and the center of the inner stator and a straight line passing through a center of the seventh permanent magnet and the center of the inner stator may be 60 degrees, an angle between straight lines passing through a center of the seventh to tenth permanent magnets and the center of the inner stator may be each 30 degrees, and an angle between a straight line passing through the center of the tenth permanent magnet and the center of the inner stator and a straight line passing through the center of the first permanent magnet and the center of the inner stator may be 30 degrees.

Through this, it is possible to reduce the cost by reducing the configuration of the driving unit while maintaining a stable output of the driving unit.

In addition, the plurality of permanent magnets may include first to eighth permanent magnets spaced apart from each other at the same distance in the circumferential direction, the first and fifth permanent magnets facing each other may face the straight portion, and the second to fourth permanent magnets and the sixth to eighth permanent magnets may face the curved portion.

Through this, it is possible to reduce the cost by reducing the configuration of the driving unit while maintaining a stable output of the driving unit.

A linear compressor according to an aspect of the present disclosure for achieving the above object may comprise a frame, a cylinder coupled to the frame, an inner stator disposed on an outer circumferential surface of the cylinder, a bobbin surrounding the inner stator in a circumferential direction, a coil wound on the bobbin, a plurality of stator cores surrounding the bobbin and spaced apart from each other in the circumferential direction, and a plurality of permanent magnets disposed between the inner stator and the plurality of stator cores.

In this case, a cross section of the bobbin may include a pair of straight portions facing each other and a curved portion connecting the pair of straight portions.

Through this, it is possible to reduce the overall size of the linear compressor by reducing the size of the driving unit.

In addition, the linear compressor may comprise an oil feeder coupled to the frame, and the straight portion may overlap the oil feeder in an axial direction. In addition, a part of the oil feeder may be disposed between the plurality of stator cores.

Through this, it is possible to reduce the interference between the oil feeder and the plurality of stator cores while reducing the size of the driving unit.

In addition, the linear compressor may comprise a terminal portion coupled to the frame and electrically connected to the coil, and the straight portion may overlap the terminal portion in an axial direction. In this case, a part of the terminal portion may be disposed between the plurality of stator cores.

Through this, it is possible to reduce the interference between the terminal portion and the plurality of stator cores while reducing the size of the driving unit.

In addition, the linear compressor may comprise a stator cover supporting rear surfaces of the plurality of stator cores, a magnet frame in Which the plurality of permanent magnets are disposed, a spring supporter coupled to the magnet frame, and a plurality of main front springs, a front of which is disposed on a rear surface of the stator cover and, a rear of which is disposed on the spring supporter.

In this case, the plurality of main front springs may overlap the plurality of stator cores in an axial direction.

Through this, it is possible to maintain the overall balance of the linear compressor while reducing the size of the driving unit.

In addition, the magnet frame may include a magnet seating portion on which the permanent magnet is disposed, a magnet coupling portion extending radially inward from a rear of the magnet seating portion, and a plurality of magnet coupling holes formed in the magnet coupling portion and spaced apart from each other in the circumferential direction, and an imaginary line connecting a central region of the magnet coupling portion and the magnet coupling hole ay overlap the plurality of stator cores in the axial direction.

In addition, an imaginary line connecting a central region of the magnet coupling portion and the magnet coupling hole may overlap a space between the plurality of permanent magnets in the axial direction.

Through this, since the position of the permanent magnet and the position of the plurality of stator cores can be determined according to the position of the magnet coupling hole of the magnet frame, it is possible to improve the manufacturing efficiency of the driving unit.

In addition, the spring supporter may include a supporter coupling portion disposed at a rear of the magnet frame, a plurality of supporter coupling holes formed in the supporter coupling portion and spaced apart from each other in the circumferential direction, and a plurality of supporter seating portions extending radially from the supporter coupling portion and in which the plurality of main front springs are disposed, and an imaginary line connecting a central region of the supporter coupling portion and the supporter coupling hole may overlap the plurality of stator cores in the axial direction.

In addition, an imaginary line connecting a central region of the supporter coupling portion and the supporter coupling hole may overlap a space between the plurality of permanent magnets in the axial direction.

Through this, since the position of the permanent magnet and the position of the plurality of stator cores can be determined according to the position of the supporter coupling hole of the spring supporter, it is possible to improve the manufacturing efficiency of the driving unit.

Through the present disclosure, it is possible to provide a driving unit capable of reducing the overall size of a linear compressor by reducing the size of the driving unit, and a linear compressor including the same.

In addition, through the present disclosure, it is possible to provide a driving unit capable of reducing the overall height of a linear compressor by reducing the height of the driving unit, and a linear compressor including the same.

In addition, through the present disclosure, it is possible to provide a driving unit capable of maintaining a stable output of the driving unit while reducing the height of the driving unit, and a linear compressor including the same.

In addition, through the present disclosure, it is possible to provide a driving unit capable of reducing the cost by reducing the configuration of the driving unit while maintaining a stable output of the driving unit, and a linear compressor including the same.

In addition, through the present disclosure, it is possible to provide a driving unit capable of reducing interference between an oil feeder and a plurality of stator cores while reducing the size of the driving unit, and a linear compressor including the same.

In addition, through the present disclosure, it is possible to provide a driving unit capable of reducing interference between a terminal portion and a plurality of stator cores while reducing the size of the driving unit, and a linear compressor including the same.

In addition, through the present disclosure, it is possible to provide a driving unit capable of maintaining the overall balance of a linear compressor while reducing the size of the driving unit, and a linear compressor including the same.

In addition, through the present disclosure, it is possible to provide a driving unit capable of improving the manufacturing efficiency of the driving unit and a linear compressor including the same since the position of the permanent magnet and the position of the plurality of stator cores can be determined according to the position of the magnet coupling hole of the magnet frame.

In addition, through the present disclosure, it is possible to provide a driving unit capable of improving the manufacturing efficiency of the driving unit and a linear compressor including the same since the position of the permanent magnet and the position of the plurality of stator cores can be determined according to the position of the supporter coupling hole of the spring supporter.

DETAILED DESCRIPTION

Figure 1:
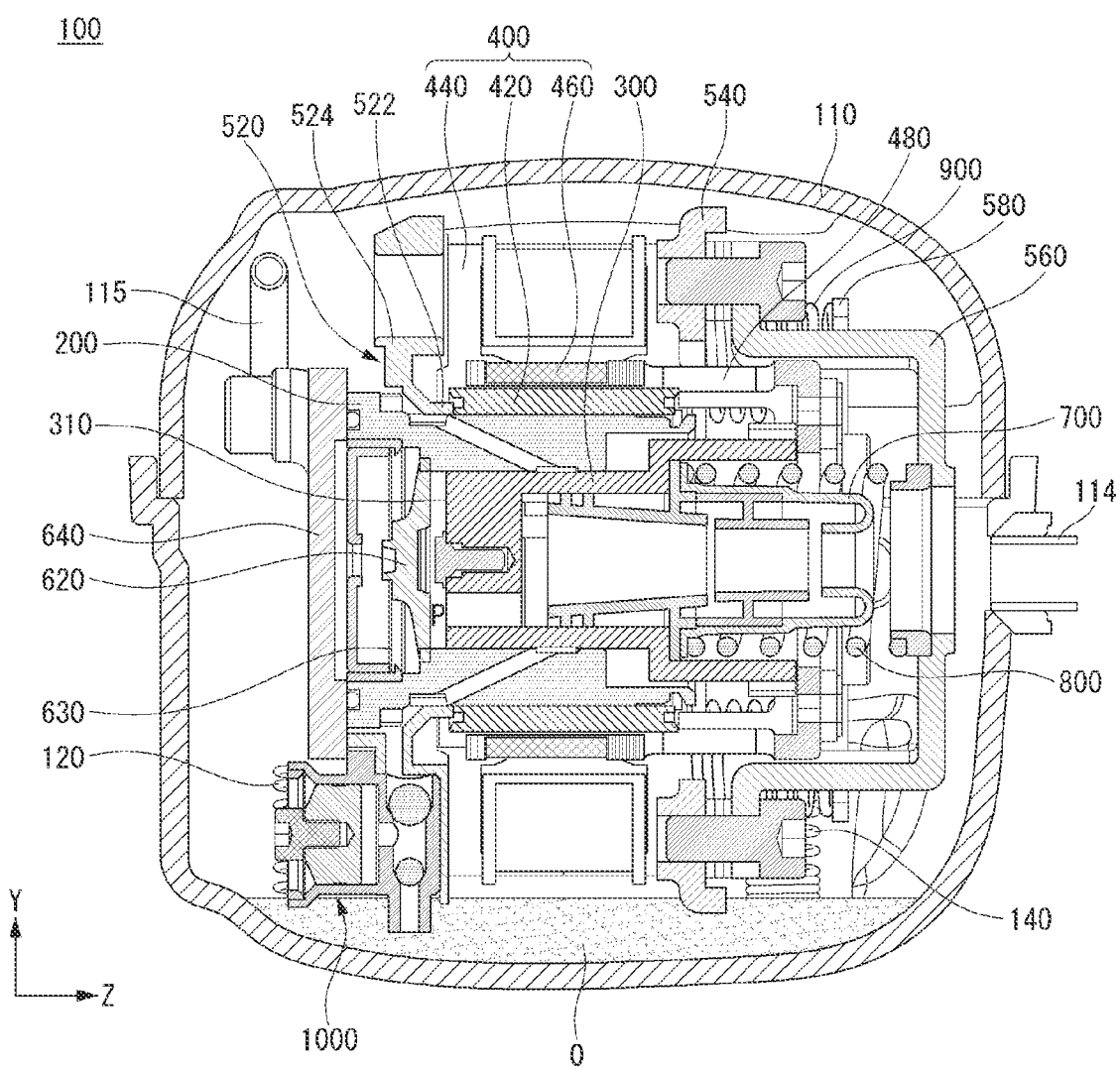
FIG. 1 is a cross-sectional view of a linear compressor according to a first embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

In describing the embodiments disclosed in the present disclosure, when a component is referred to as being "connected" or "accessed" to other component, it may be directly connected or accessed to the other component, however, it may be understood that other components may be present in the middle.

In addition, in describing the embodiments disclosed in the present disclosure, when it is determined that the detailed description of the related known technology may obscure the subject matter of the embodiments disclosed in the present disclosure, the detailed description thereof will be omitted. In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

On the other hand, terms of disclosure may be replaced with terms such as document, specification, description.

Figure 2:
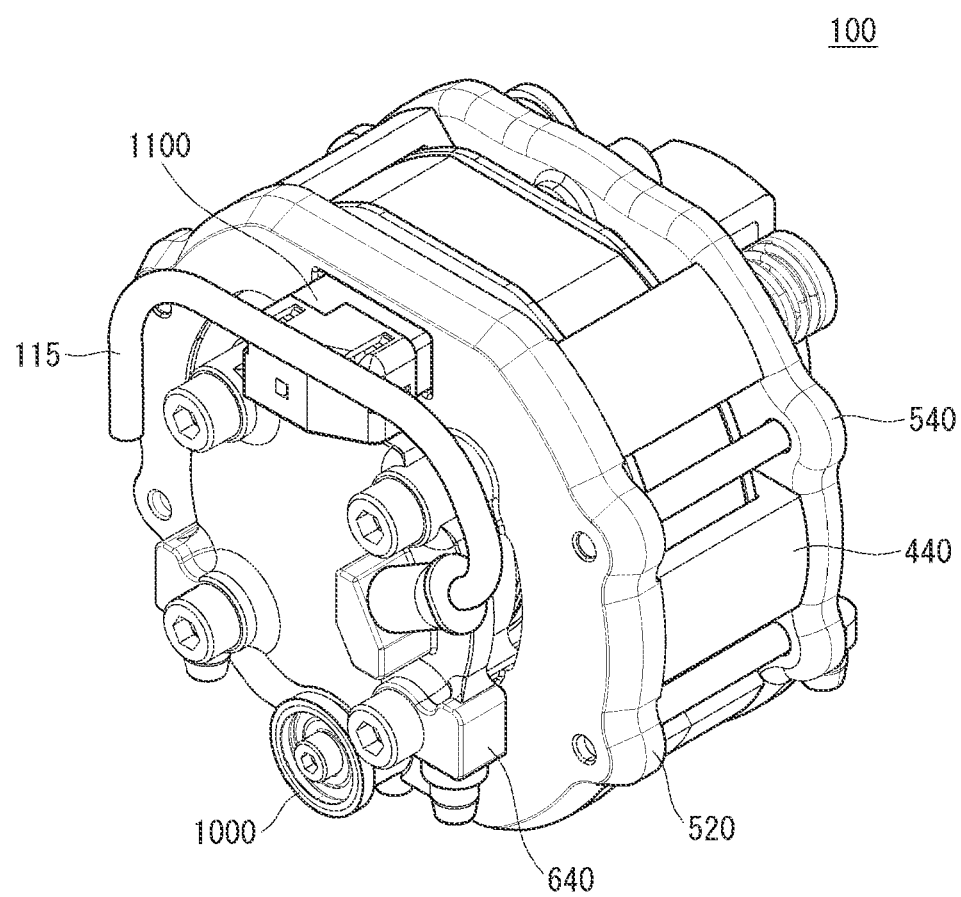
FIGS. 2 and 3 are perspective views of a configuration in which a shell of a linear compressor is removed according to a first embodiment of the present disclosure.
Figure 3:
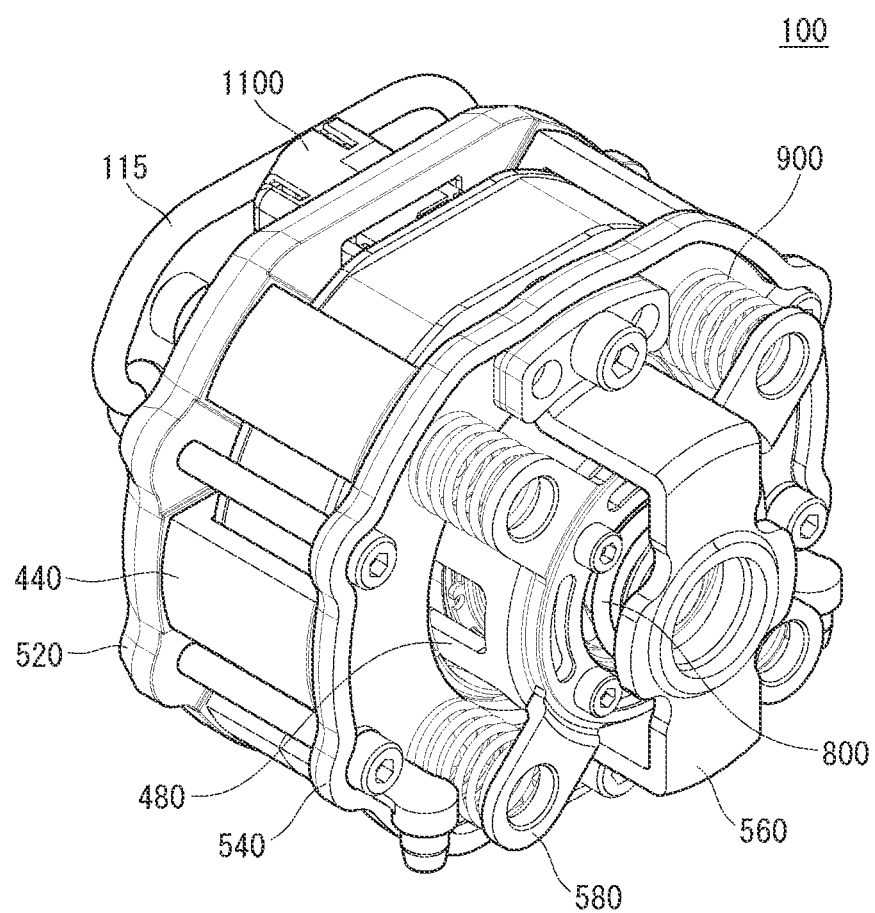
Figure 4:
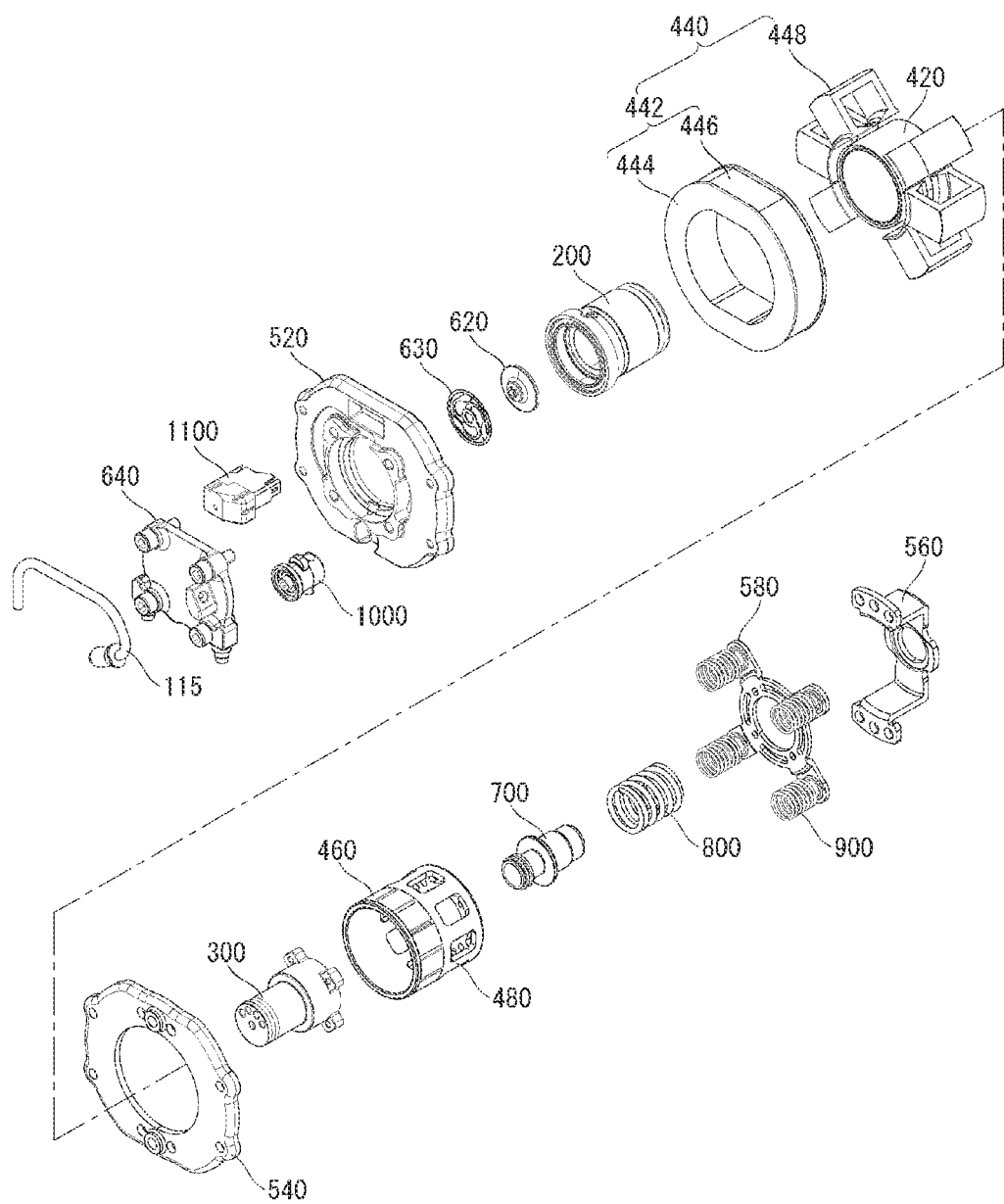
FIG. 4 is an exploded perspective view of a configuration in which a shell of a linear compressor is removed according to a first embodiment of the present disclosure.

FIG. 1 is a cross-sectional view of a linear compressor according to a first embodiment of the present disclosure, FIGS. 2 and 3 are perspective views of a configuration in which a shell of a linear compressor is removed according to a first embodiment of the present disclosure. FIG. 4 is an exploded perspective view of a configuration in which a shell of a linear compressor is removed according to a first embodiment of the present disclosure.

Hereinafter, a linear compressor 100 according to the present disclosure may be described as an example of the linear compressor 100 in Which a piston performs an operation of sucking and compressing a fluid while linear reciprocating motion, and discharging the compressed fluid.

The linear compressor 100 may be a component of a refrigeration cycle, and a fluid compressed in the linear compressor 100 may be a refrigerant circulating in the refrigeration cycle. The refrigeration cycle may include a condenser, an expansion device and an evaporator in addition to the compressor. In addition, the linear compressor 100 may be used as one component of the cooling system of the refrigerator, and is not limited thereto, and may be widely used throughout the industry.

Referring to FIGS. 1 to 5, the linear compressor 100 ma include a shell 110 and a body accommodated in the shell 110. The body of the linear compressor 100 may include a frame 520, a cylinder 200 fixed to the frame 520, a piston 300 linearly reciprocating inside the cylinder 200, a driving unit 400 fixed to the frame 520 and providing driving force to the piston 300, and the like. Here, the cylinder 200 and the piston 300 may be referred to as compression units 200 and 300.

The shell 110 may include a lower shell and an upper shell coupled to an upper portion of the lower shell. The inside of the shell 110 may form a closed space. Also, the upper shell and the lower shell may be integrally formed.

The shell 110 may be formed of a thermally conductive material. Through this heat generated in the inner space of the shell 110 may be quickly radiated to the outside.

On the lower side of the shell 110, legs (not shown) may be coupled. The legs may be coupled to a base of a product on which the linear compressor 100 is installed. For example, the product may include a refrigerator and the base may include a machine room base of the refrigerator. As another example, the product may include an outdoor unit of an air conditioner, and the base ma include a base of the outdoor unit.

The shell 110 may have a cylindrical shape, and may form an arrangement lying in a transverse direction or an arrangement lying in an axial direction. Based on FIG. 1, the shell 110 may extend long in the transverse direction, and may have a rather low height in a radial direction. That is, since the linear compressor 100 may have a low height, for example, when the linear compressor 100 is installed in the machine room base of the refrigerator, there is an advantage that the height of the machine room can be reduced.

In the first embodiment of the present disclosure, the axial direction may be understood to mean a horizontal direction based on FIG. 1, and the radial direction may be understood to mean a vertical direction based on FIG. 1. In addition, in the first embodiment of the present disclosure, a front may be interpreted to mean a left direction based on FIG. 1, and a rear may be interpreted to mean a right direction based on FIG. 1.

In addition, the longitudinal central axis of the shell 110 coincides with the central axis of the linear compressor 100 to be described later, and the central axis of the linear compressor 100 coincides with the central axis of the cylinder 200 and the piston 300 of the linear compressor 100.

A terminal (not shown) may be installed on the outer surface of the shell 110. The terminal may transmit external power to the driving unit 400 of the linear compressor 100 through a terminal portion 1100. Specifically, the terminal may be connected to a lead wire of a coil wound around an outer stator 440.

The linear compressor 100 may include a plurality of pipes 114 and 115 provided in the shell 110, and capable of sucking, discharging, or injecting the refrigerant.

The plurality of pipes 114 and 115 may include a suction pipe 114 for allowing the refrigerant to be sucked into the linear compressor 100, and a loop pipe 115 for allowing the compressed refrigerant to be discharged from the linear compressor 100.

For example, the suction pipe 114 may be coupled to the rear of the shell 110. The refrigerant may be sucked into the linear compressor 100 along the axial direction through the suction pipe 114. The loop pipe 115 may be coupled to the front of the shell 110. The refrigerant sucked through the suction pipe 114 may be compressed while flowing in the axial direction. And the compressed refrigerant may be discharged through the loop pipe 115. The suction pipe 114 may be coupled to the rear of the lower shell, and the loop pipe 115 may be coupled to the front of the lower shell.

The linear compressor 100 may include a bearing means for reducing friction between the cylinder 200 and the piston 300. The bearing means may be oil bearings or gas bearings. Alternatively, a mechanical bearing may be used as the bearing means.

The body of the linear compressor 100 may be elastically supported by support springs 120 and 140 installed in the lower inner side of the shell 110. The support springs 120 and 140 may include a front support spring 120 for supporting the front of the body and a rear support spring 140 for supporting the rear of the body. The support springs 120 and 140 may include coil springs. The support springs 120 and 140 may absorb vibrations and shocks generated according to the reciprocating motion of the piston 300 while supporting the internal components of the body of the linear compressor 100.

The frame 520 includes a body portion 522 supporting an outer circumferential surface of the cylinder 200, and a first flange portion 524 connected to one side of the body portion 522 and supporting the driving unit 400. The frame 520 may be elastically supported with respect to the shell 110 by the support springs 120 and 140 together with the driving unit 400 and the cylinder 200.

The body portion 522 may surround the outer circumferential surface of the cylinder 200. The body portion 522 may be formed in a cylindrical shape. The first flange portion 524 may be formed to extend radially from the front end of the body portion 522.

The cylinder 200 may be coupled to an inner circumferential surface of the body portion 522. The body portion 522 may be penetrated by an inner stator 420. For example, the cylinder 200 may be fixed by press fitting on the inner circumferential surface of the body portion 522, and the inner stator 420 may be fixed to the outer circumferential surface of the cylinder 200 passing through the body portion 522.

The outer stator 440 may be coupled to the rear surface of the first flange portion 524, and a discharge cover 640 may be coupled to the front surface of the first flange portion 524. For example, the outer stator 440 and the discharge cover 640 may be fixed through a mechanical coupling means.

An oil hole forming a part of an oil bearing may be formed on an outer circumferential surface of the first flange portion 524, and a first bearing communication hole penetrating from the bearing inlet groove to the inner circumferential surface of the body portion 522 may be formed on an outer circumferential surface of the first flange portion 524. The first bearing communication hole may communicate with a second bearing communication hole of the cylinder 200. The first hearing communication hole and the second hearing communication hole may be formed to be inclined toward an inner circumferential surface of the cylinder 200. The second hearing communication hole of the cylinder 200 may communicate with an oil groove formed on the inner circumferential surface of the cylinder 200. The oil groove of the cylinder 200 may be formed in an annular shape having a predetermined depth and an axial length on the inner circumferential surface of the cylinder 200.

Through an oil feeder 1000, the oil (O) stored on the bottom surface of the shell 110 may sequentially pass through the oil hole, the first bearing communication hole, the second bearing communication hole, and the oil groove, and may be supplied between the inner circumferential surface of the cylinder 200 and the outer circumferential surface of the piston 300.

Meanwhile, the frame 520 and the cylinder 200 may be formed of aluminum or an aluminum alloy material.

The cylinder 200 may be formed in a cylindrical shape in which both ends are open. The piston 300 may be inserted through the rear end of the cylinder 200. The front end of the cylinder 200 may be closed through the discharge cover 640.

A discharge valve 620 may be disposed between the front end of the piston 300 and the discharge cover 640 and the cylinder 200. A compression space P may be formed between the front end of the piston 300, the discharge valve 620, and the cylinder 200. Here, the front end of the piston 300 may be referred to as a head portion. The compression space P may increase in volume when the piston 300 moves backward, and may decrease in volume as the piston 300 moves forward. That is, the refrigerant introduced into the compression space P may be compressed while the piston 300 moves forward and discharged through the discharge valve 620.

The cylinder 200 may include a second flange portion disposed at the front end. The second flange portion may be bent outwardly of the cylinder 200. The second flange portion may extend in an outer circumferential direction of the cylinder 200. The second flange portion of the cylinder 200 may be coupled to the frame 520.

On the other hand, an oil bearing means capable of lubricating oil between the cylinder 200 and the piston 300 by supplying oil to an interval between the outer circumferential surface of the piston 300 and the inner circumferential surface of the cylinder 200 may be provided. The oil between the cylinder 200 and the piston 300 may reduce friction generated between the piston 300 and the cylinder 200.

The piston 300 is inserted into the open end of the rear of the cylinder 200, and is provided to seal the rear of the compression space (P).

The piston 300 may include a head portion and a guide portion. The head portion may be formed in a disk shape. The head portion may be partially open. The head portion may partition the compression space (P). The guide portion may extend rearward from the outer circumferential surface of the head portion. The guide portion may be formed in a rough cylindrical shape. The guide portion may be hollow inside, and the front of which may be partially closed by the head portion. The rear of the guide portion may be opened and connected to a muffler unit 700. The head portion may be provided as a separate member coupled to the guide portion. Alternatively, the head portion and the guide portion may be integrally formed.

The piston 300 may include a suction port. The suction port may pass through the head portion. The suction port may extend in an axial direction of the piston 300. The suction port may communicate with a suction space inside the piston 300 and the compression space (P). For example, the refrigerant flowing into the suction space inside the piston 300 may pass through the suction port and may be sucked into the compression space P between the piston 300 and the cylinder 200.

A plurality of suction ports may be formed in any one or more directions of a radial direction and a circumferential direction of the head portion.

A suction valve 310 fix selectively opening and closing the suction port may be mounted on the head of the piston 300 adjacent to the compression space P. The suction valve 310 may open or close the suction port by operating by elastic deformation. That is, the suction valve 310 may be elastically deformed to open the suction port by the pressure of the refrigerant flowing into the compression space P through the suction port.

The piston 300 may be connected to a permanent magnet 460. The piston 300 may reciprocate in the front-rear direction according to the movement of the permanent magnet 460. The inner stator 420 and the cylinder 200 may be disposed between the permanent magnet 460 and the piston 300. The permanent magnet 460 and the piston 300 may be connected to each other by a magnet frame 480 formed by bypassing the cylinder 200 and the inner stator 420 to the rear.

The muffler unit 700 may be coupled to the rear of the piston 300 to reduce noise generated while the refrigerant is sucked into the piston 300. The refrigerant sucked through the suction pipe 114 may flow into the suction space 102 inside the piston 300 through the muffler unit 700.

A discharge valve spring 630 may be provided on the front side of the discharge valve 620 to elastically support the discharge valve 620. The discharge valve 620 may selectively discharge the refrigerant compressed in the compression space P. Here, the compression space P means a space formed between the suction valve 310 and the discharge valve 620.

The discharge valve 620 may be disposed to be supported by the cylinder 200. The discharge valve 620 may selectively open and close the front opening of the cylinder 200. The discharge valve 620 may open or close the compression space P by operating by elastic deformation. The discharge valve 620 may be elastically deformed to open the compression space P by the pressure of the refrigerant flowing into the discharge space through the compression space P.

The discharge valve spring 630 may be provided between the discharge valve 620 and the discharge cover 640 to provide an elastic force in the axial direction. The discharge valve spring 630 may be provided as a compression coil spring, or may be provided as a leaf spring in consideration of occupied space or reliability.

When the pressure in the compression space P is equal to or greater than the discharge pressure, the discharge valve spring 630 may be deformed forward to open the discharge valve 620, and the refrigerant may be discharged from the compression space P and discharged to the discharge space inside the discharge cover 640. When the discharge of the refrigerant is completed, the discharge valve spring 630 may provide a restoring force to the discharge valve 620 to close the discharge valve 620.

A process in which the refrigerant flows into the compression space P through the suction valve 310 and the refrigerant in the compression space P is discharged to the discharge space through the discharge valve 620 will be described as follows.

In the process of the piston 300 reciprocating and linear motion inside the cylinder 200, when the pressure of the compression space P becomes less than a predetermined suction pressure, the suction valve 310 is opened and the refrigerant is sucked into the compression space P. On the other hand, when the pressure in the compression space P exceeds the predetermined suction pressure, the refrigerant in the compression space P is compressed in a state in which the suction valve 310 is closed.

On the other hand, when the pressure in the compression space (P) is greater than or equal to a predetermined discharge pressure, the discharge valve spring 630 is deformed forward and opens the discharge valve 620 connected thereto, and the refrigerant is discharged from the compression space P to the discharge space inside the discharge cover 640. When the discharge of the refrigerant is completed, the discharge valve spring 630 provides a restoring force to the discharge valve 620, and the discharge valve 620 is closed to seal the front of the compression space P.

The discharge cover 640 may be installed in front of the compression space P to form a discharge space for accommodating the refrigerant discharged from the compression space P, and coupled to the front of the cylinder 200 and/or the frame 520 to reduce noise generated while the refrigerant is discharged from the compressed space P. The discharge cover 640 may be coupled to the front end of the cylinder 200 while accommodating the discharge valve 620.

In addition, a gasket for insulation and an O-ring for suppressing leakage of the refrigerant in the discharge space may be provided between the discharge cover 640 and the front end of the cylinder 200.

The discharge cover 640 may be formed of a thermally conductive material. Accordingly, when a high-temperature refrigerant flows into the discharge cover 640, the heat of the refrigerant is transferred to the shell 110 through the discharge cover 640 to be radiated to the outside of the compressor.

The discharge cover 640 may be formed of a single discharge cover, or a plurality of discharge covers may be arranged to communicate sequentially. When the discharge cover 640 is provided with the plurality of discharge covers, the discharge space may include a plurality of space portions partitioned by each discharge cover. The plurality of space portions may be disposed in the front-rear direction and may communicate with each other. Accordingly, while the refrigerant discharged from the compression space P passes through the plurality of discharge spaces in turn, the discharge noise may be attenuated, and may be discharged to the outside of the shell 110 through the loop pipe 115.

The driving unit 400 may include the outer stator 440 disposed to surround the body portion 522 of the frame 520 between the shell 110 and the frame 520, the inner stator 420 disposed to surround the cylinder 200 between the outer stator 440 and the cylinder 200, and the permanent magnet 460 disposed between the outer stator 440 and the inner stator 420. The driving unit 400 may be referred to as a 'linear motor'.

The outer stator 440 may be coupled to the rear of the first flange portion 524 of the frame 520, and the inner stator 420 may be coupled to the outer circumferential surface of the cylinder 200. In addition, the inner stator 420 may be disposed to be spaced apart from the inside of the outer stator 440, and the permanent magnet 460 may be disposed in a space between the outer stator 440 and the inner stator 420.

A winding coil 446 may be mounted on the outer stator 440, and the permanent magnet 460 may be configured as a single magnet having one pole, or may be configured by combining a plurality of magnets having three poles.

The outer stator 440 may include a coil winding body 442 surrounding the axial direction in the circumferential direction and a stator core 448 stacked while surrounding the coil winding body 442. The coil winding body 442 may include a bobbin 444 having a hollow cylindrical shape and a coil 446 wound in a circumferential direction of the bobbin 444. Alternatively, the coil winding body 442 may include a bobbin extending inside the stator core 448 and a coil wound around the bobbin. The cross-section of the coil 446 may be formed in a circular or polygonal shape, for example, may have a hexagonal shape. In the stator core 448, a plurality of lamination sheets may be radially stacked, and a plurality of lamination blocks may be stacked along a circumferential direction.

The front side of the outer stator 440 may be supported by the first flange portion 524 of the frame 520, and the rear side may be supported by a stator cover 540.

For example, the outer stator 440 may be supported on the front surface of the stator cover 540, and a back cover 560 may be coupled to the rear surface of the stator cover 540.

The inner stator 420 may be configured by stacking a plurality of laminations on the outer circumferential surface of the cylinder 200 in a radial direction.

The permanent magnet 460 may be supported by coupling one side of the permanent magnet to the magnet frame 480. The magnet frame 480 has a rough cylindrical shape and may be disposed to be inserted into a space between the outer stator 440 and the inner stator 420. In addition, the magnet frame 480 may be coupled to the rear side of the piston 300 to be provided to move together with the piston 300.

For example, the rear end of the magnet frame 480 may be bent and extended inward in the radial direction to be coupled to the rear of the piston 300.

When a current is applied to the driving unit 400, a magnetic flux may be formed in the winding coil, and electromagnetic force is generated by the interaction between the magnetic flux formed in the winding coil of the outer stator 440 and the magnetic flux formed by the permanent magnet 460, so that the permanent magnet 460 may move. Also, the piston 300 connected to the magnet frame 480 may reciprocate in the axial direction integrally with the permanent magnet 460 at the same time as the reciprocating movement of the permanent magnet 460 in the axial direction.

Meanwhile, the driving unit 400 and the compression units 200 and 300 may be supported in the axial direction by a main rear spring 800. The main rear spring 800 may be a coil spring extending in the axial direction or the horizontal direction. The front end of the main rear spring 800 may support the muffler unit 700 seated on the step portion of the piston 300, and the rear end of the main rear spring 800 may be supported by a back cover 560 coupled to the rear surface of the stator cover 540. The main rear spring 800 may surround the outer diameter of the muffler unit 700.

The rear surface of the stator cover 540 may be axially supported by a main front spring 900 mounted on a spring supporter 580 coupled to the muffler unit 700. The main front spring 900 may be a coil spring extending in the axial direction or the horizontal direction. The front end of the main front spring 900 may be seated on the rear surface of the stator cover 540, and the rear end of the main front spring 900 may be supported by the spring supporter 580. The central region of the main front spring 900 may be located axially forward than the central region of the main rear spring 800. The main front spring 900 may include a plurality of main front springs 900 that are spaced apart in the circumferential direction. In the embodiment of the present disclosure, the main front springs 900 is described as an example consisting of four coil springs spaced at equal intervals in the circumferential direction, but the number of the plurality of main front springs 900 may be variously changed.

The operation of the linear compressor 100 described above is as follows.

First, when a current is applied to the driving unit 400, a magnetic flux may be formed in the outer stator 440 by the current flowing in the coil. The magnetic flux formed in the outer stator 440 may generate an electromagnetic force, and the permanent magnet 460 may reciprocate linearly by the generated electromagnetic force. This electromagnetic force may be generated in a direction (forward direction) in which the piston 300 is directed toward the top dead center (TDC) during the compression stroke, and may be generated alternately in the direction (rear direction) in which the piston 300 is directed toward the bottom dead center (BDC) during the suction stroke. That is, the driving unit 400 may generate thrust, which is a force that pushes the permanent magnet 460 and the piston 300 in a moving direction.

The piston 300 reciprocating linearly within the cylinder 200 may repeatedly increase or decrease the volume of the compression space P.

When the piston 300 moves in a direction (rear direction) to increase the volume of the compression space P, the pressure of the compression space P may decrease. Accordingly, the suction valve 310 mounted in front of the piston 300 may be opened, and the refrigerant staying in the suction space 102 may be sucked into the compression space P along the suction port 154. This suction stroke may proceed until the piston 300 is positioned at the bottom dead center by maximally increasing the volume of the compression space P.

The piston 300 that has reached the bottom dead center may perform the compression stroke while moving in a direction (forward direction) in which the movement direction is changed to decrease the volume of the compression space P. During the compression stroke, the suctioned refrigerant may be compressed while the pressure of the compression space P is increased. When the pressure of the compression space P reaches a set pressure, the discharge valve 620 may be pushed by the pressure of the compression space P and the refrigerant may be discharged into the discharge space. This compression stroke may be continued while the piston 300 moves to top dead center at which the volume of the compression space P is minimized.

As the suction stroke and the compression stroke of the piston 300 are repeated, the refrigerant introduced into the linear compressor 100 through the suction pipe 114 may be introduced into the piston 300 via the muffler unit 700, and the refrigerant inside the piston 300 may be introduced into the compression space P inside the cylinder 200 during the suction stroke of the piston 300. After the refrigerant in the compression space P is compressed during the compression stroke of the piston 300 and discharged to the discharge space, a flow discharged to the outside of the linear compressor 100 through the loop pipe 115 may be formed.

Figure 5:
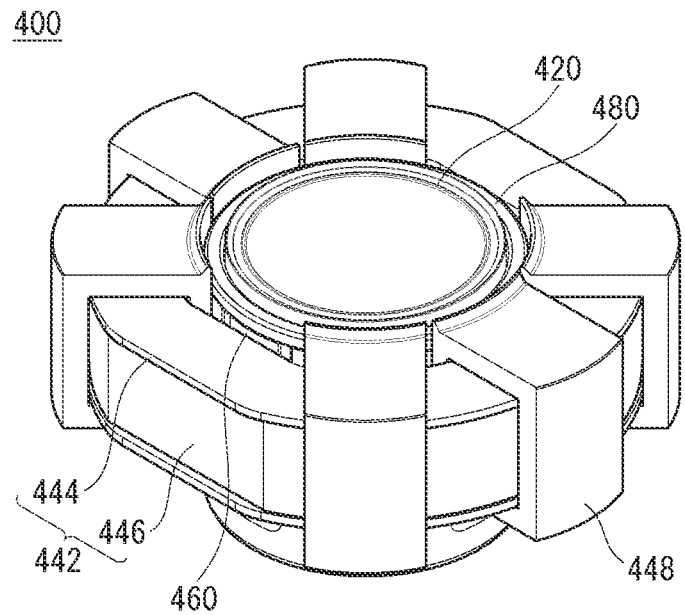
FIG. 5 is a perspective view of a driving unit of a linear compressor according to a first embodiment of the present disclosure.
Figure 6:
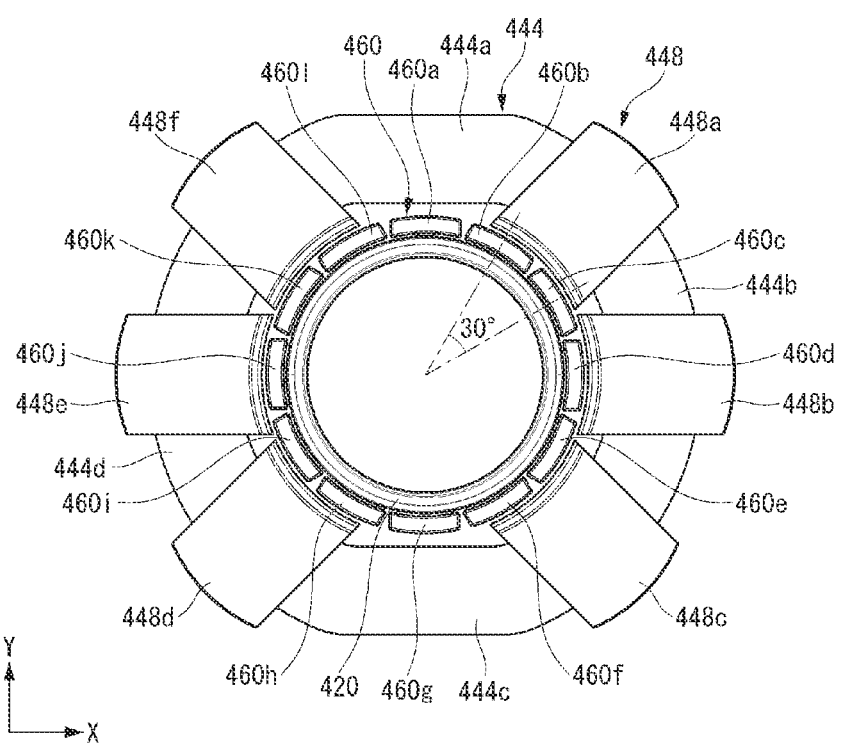
FIG. 6 is a front view of a driving unit of a linear compressor according to a first embodiment of the present disclosure.
Figure 7:
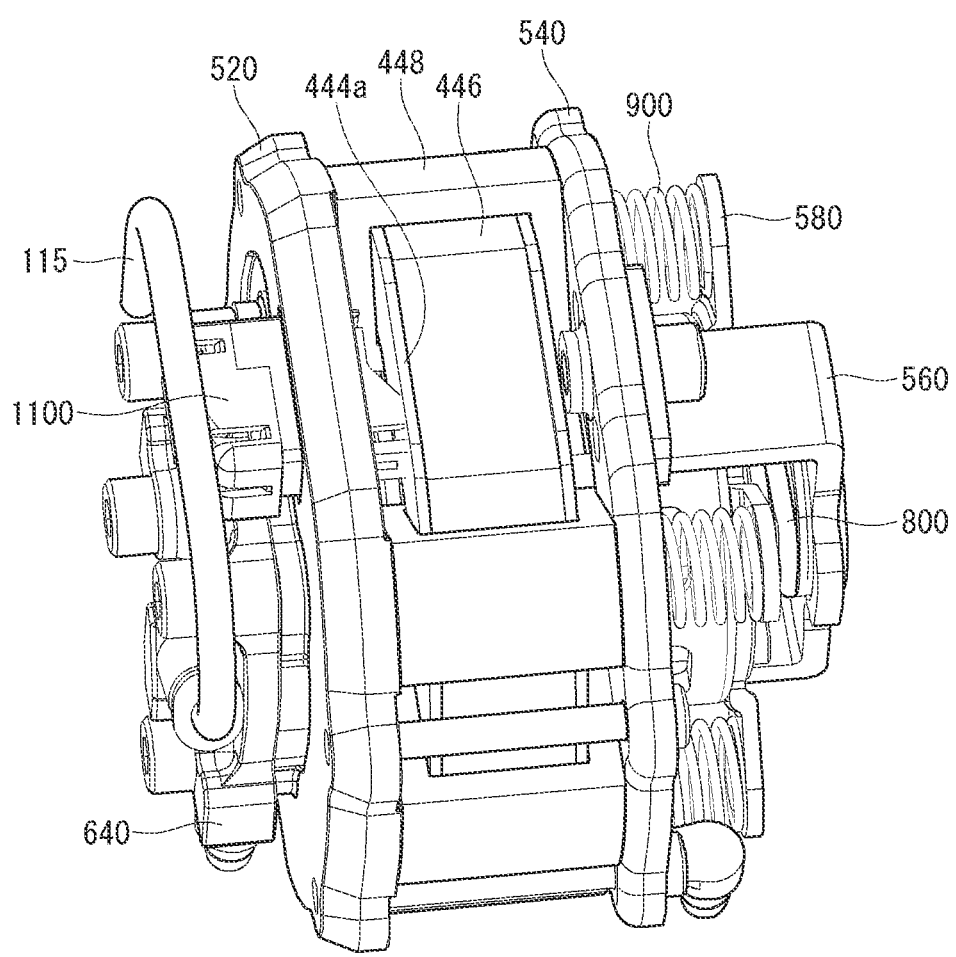
FIGS. 7 and 8 are perspective views of a configuration in which a shell of a linear compressor is removed according to a first embodiment of the present disclosure.
Figure 8:
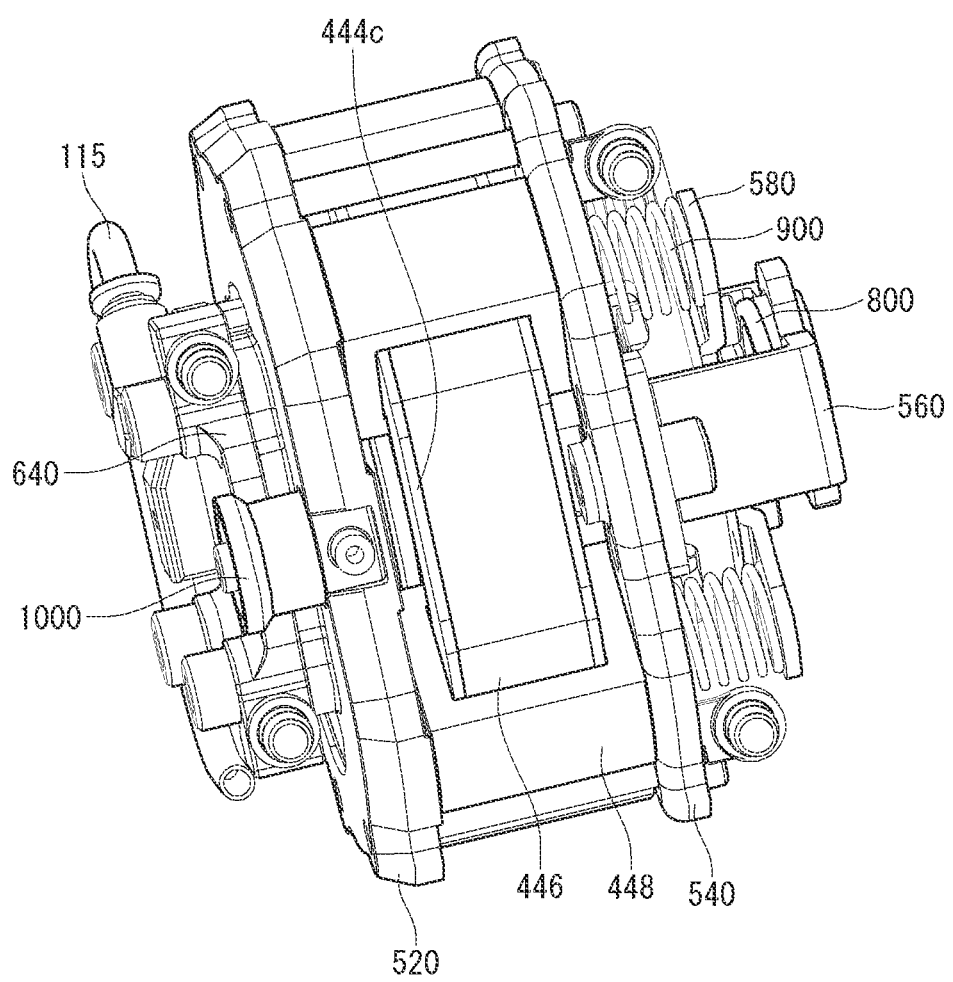
Figure 9:
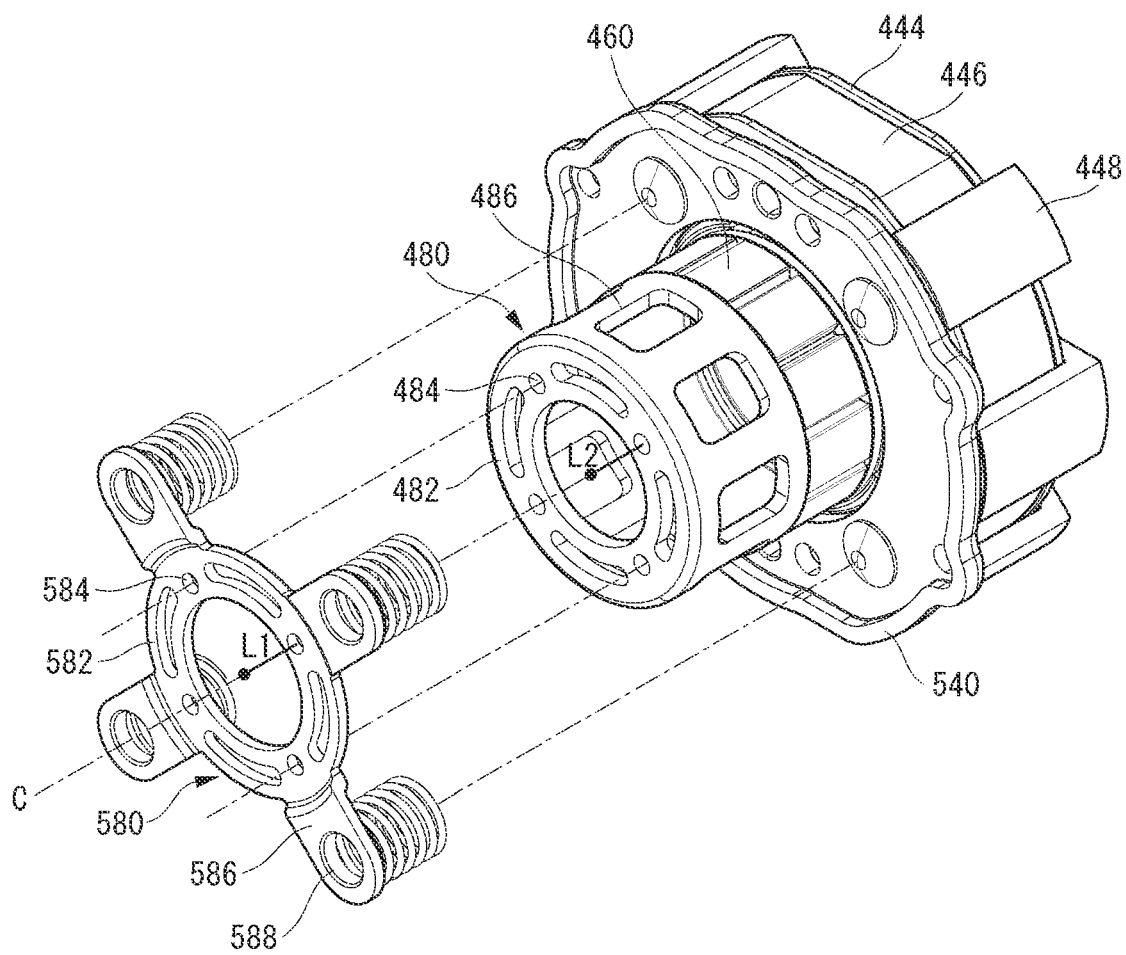
FIG. 9 is an exploded perspective view of a driving unit, a magnet frame, and a spring supporter of a linear compressor according to a first embodiment of the present disclosure.
Figure 10:
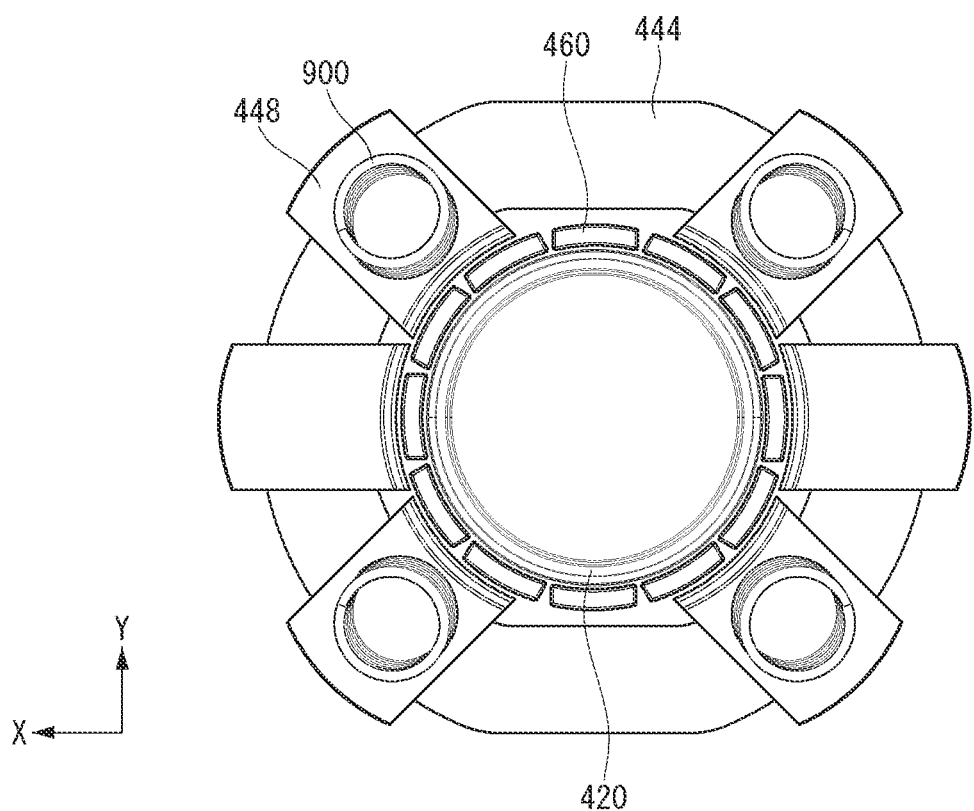
FIG. 10 is a rear view of a driving unit of a linear compressor and a main front spring according to a first embodiment of the present disclosure.

FIG. 5 is a perspective view of a driving unit of a linear compressor according to a first embodiment of the present disclosure. FIG. 6 is a front view of a driving unit of a linear compressor according to a first embodiment of the present disclosure. FIGS. 7 and 8 are perspective views of a configuration in which a shell of a linear compressor is removed according to a first embodiment of the present disclosure. FIG. 9 is an exploded perspective view of a driving unit, a magnet frame, and a spring supporter of a linear compressor according to a first embodiment of the present disclosure. FIG. 10 is a rear view of a driving unit of a linear compressor and a main front spring according to a first embodiment of the present disclosure.

Referring to FIGS. 5 and 6, the driving unit 400 according to a first embodiment of the present disclosure may include the inner stator 420, the bobbin 444, the coil 446, the stator core 448, and the permanent magnet 460, but may be implemented except for some of these configurations, and does not exclude additional configurations.

The inner stator 420 may be formed in a cylindrical shape. In the inner stator 420, a plurality of lamination sheets may be stacked in the radial direction. The inner stator 420 may be disposed radially inside the permanent magnet 460.

The bobbin 444 may surround the inner stator 420 in a circumferential direction. The bobbin 444 may be formed in a cylindrical shape with an opening formed therein as a whole. The coil 446 may be wound in a groove formed on the outer circumferential surface of the bobbin 444.

A cross section of the bobbin 444 may include a pair of straight portions 444a and 444c facing each other and curved portions 444b and 444d connecting the pair of straight portions 444a and 444c. Through this, it is possible to reduce the overall size of the linear compressor by reducing the size of the driving unit 400.

The straight portions 444a and 444c may be formed in an upper region and a lower region of the bobbin 444. For example, the bobbin 444 may include a first straight portion 444a positioned on the upper portion, a first curved portion 444b connected to the right side of the first straight portion 444a and having a first radius of curvature, a second straight portion 444c connected to the first curved portion 444b and positioned below the bobbin 444, and a second curved portion 444d connected to the left side of the second straight portion 444c and having the first radius of curvature. Alternatively, the first curved portion 444b and the second curved portion 444d may not have a constant radius of curvature. Through this, it is possible to reduce the overall height of the linear compressor by reducing the height of the driving unit 400.

The widths of the straight portions 444a and 444c and the widths of the curved portions 444b and 444d may be the same as each other. The stator core 448 may not be disposed on the straight portions 444a and 444c. The stator core 448 may be disposed on the curved portions 444b and 444d.

The stator core 448 may surround the bobbin 444. The stator core 448 may not be disposed on the straight portions 444a and 444c, but may be disposed only on the curved portions 444b and 444d. Through this, it is possible to reduce the overall height of the linear compressor by reducing the height of the driving unit 400.

The stator core 448 may include a plurality of stator cores 448a. 448b, 448c, 448d. 448e, and 448f. The plurality of stator cores 448a, 448b, 448c, 448d, 448e, and 448f may be spaced apart from each other in the circumferential direction. In this case, the plurality of stator cores 448a, 448b, 448c, 448d, 448e, and 448f may not be disposed on the straight portions 444a and 444c, but may be disposed only on the curved portions 444b and 444d. The plurality of stator cores 448a, 448b, 448c, 448d, 448e, and 448f may be formed to have the same shape as each other. Through this, it is possible to reduce the overall height of the linear compressor by reducing the height of the driving unit 400.

The plurality of stator cores 448a. 448b, 448c, 448d, 448e, and 448f may include a first stator core 448a, a second stator core 448b, a third stator core 448c, a fourth stator core 448d, a fifth stator core 448e, and a sixth stator core 448f. In the first embodiment of the present disclosure, the plurality of stator cores 448a, 448b, 448c, 448d, 448e, and 448f are described as an example of six, but the number of the plurality of stator cores 448a, 448b, 448c, 448d, 448e, and 448f may be variously changed according to the size of the linear compressor 100.

An angle between a straight line passing through the center of the first stator core 448a and the center of the inner stator 420 and a straight line passing through the center of the second stator core 448b and the center of the inner stator 420 may be 45 degrees. An angle between the straight line passing through the center of the second stator core 448b and the center of the inner stator 420 and a straight line passing through the center of the third stator core 448c and the center of the inner stator 420 may be 45 degrees. An angle between the straight line passing through the center of the third stator core 448c and the center of the inner stator 420 and a straight line passing through the center of the fourth stator core 448d and the center of the inner stator 420 may be 90 degrees. An angle between the straight line passing through the center of the fourth stator core 448d and the center of the inner stator 420 and a straight line passing through the center of the fifth stator core 448e and the center of the inner stator 420 may be 45 degrees. An angle between the straight line passing through the center of the fifth stator core 448e and the center of the inner stator 420 and a straight line passing through the center of the sixth stator core 448f and the center of the inner stator 420 may be 45 degrees. An angle between the straight line passing through the center of the sixth stator core 448f and the center of the inner stator 420 and the straight line passing through the center of the first stator core 448a and the center of the inner stator 420 may be 90 degrees. Through this, it is possible to maintain a stable output of the driving unit 400 while reducing the height of the driving unit 400.

The permanent magnet 460 may be disposed between the inner stator 420 and the plurality of stator cores 448. The permanent magnet 460 may be disposed between the inner stator 420 and the bobbin 444.

The permanent magnet 460 may include a plurality of permanent magnets 460a, 460b, 460c, 460d, 460e, 460f, 460g, 460h, 460i, 460j, 460k, and 460l. The plurality of permanent magnets 460a, 460b, 460c, 460d, 460e, 460f, 460g, 460h, 460i, 460j, 460k, and 460l may be spaced apart from each other in the circumferential direction. The plurality of permanent magnets 460a, 460b, 460c, 460d, 460e, 460f, 460g, 460h, 460i, 460j, 460k, and 460l may have the same circumferential distance and angle as each other. The plurality of permanent magnets 460a, 460b, 460c, 460d, 460e, 460f, 460g, 460h, 460i, 460j, 460k, and 460l may be formed to have the same shape as each other.

The plurality of permanent magnets 460a, 460b, 460c, 460d, 460e, 460f, 460g, 460h, 460i, 460j, 460k, and 460l may include a first permanent magnet 460a, a second permanent magnet 460b, a third permanent magnet 460c, a fourth permanent magnet 460d, a fifth permanent magnet 460e, a sixth permanent magnet 460f, a seventh permanent magnet 460g, and an eighth permanent magnet 460h, a ninth permanent magnet 460i, a tenth permanent magnet 460j, an eleventh permanent magnet 460k, and a twelfth permanent magnet 460l. In the first embodiment of the present disclosure, the number of the plurality of permanent magnets 460a, 460b, 460c, 460d, 460e, 460f, 460g, 460h, 460i, 460j, 460k, and 460l will be described as an example of 12.

The first permanent magnet 460a and the seventh permanent magnet 460g may face each other. The first permanent magnet 460a and the seventh permanent magnet 460g may face only the straight portions 444a and 444c. The first permanent magnet 460a and the seventh permanent magnet 460g may not face the stator core 448.

A central region of the second permanent magnet 460b, the third permanent magnet 460c, the fourth permanent magnet 460d, the fifth permanent magnet 460e, the sixth permanent magnet 460f, the eighth permanent magnet 460h, the ninth permanent magnet 460i, the tenth permanent magnet 460j, the eleventh permanent magnet 460k, and the twelfth permanent magnet 460l may face the curved portions 444b and 444d. The second permanent magnet 460b, the third permanent magnet 460c, the fourth permanent magnet 460d, the fifth permanent magnet 460e, the sixth permanent magnet 460f, the eighth permanent magnet 460h, the ninth permanent magnet 460i, the tenth permanent magnet 460j, the eleventh permanent magnet 460k, and the twelfth permanent magnet 460l may face the stator core 448.

Through this, it is possible to maintain a stable output of the driving unit 400 while reducing the height of the driving unit 400.

Referring to FIG. 7, the terminal portion 1100 may be coupled to the frame 520 and electrically connected to the coil 446. At least a portion of the terminal portion 1100 may overlap the first straight portion 444a in the axial direction. At least a portion of the terminal portion 1100 may be disposed between the plurality of stator cores 448a, 448b, 448c, 448d, 448e, and 448f The terminal portion 1100 may not overlap the stator core 448 in the axial direction.

Through this, it s possible to reduce the interference between the terminal portion 1100 and the plurality of stator cores 448a, 448b, 448c, 448d, 448e, and 448f while reducing the size of the driving unit 400.

Referring to FIG. 8, an oil feeder 1000 may be coupled to the frame 520. At least a portion of the oil feeder 1000 may overlap the second straight portion 444c in the axial direction. At least the portion of the oil feeder 1000 may be disposed between the plurality of stator cores 448a, 448b, 448c, 448d, 448e, and 448f The oil feeder 1000 may not overlap the stator core 448 in the axial direction.

Through this, it is possible to reduce the interference between the oil feeder 1000 and the plurality of stator cores 448a, 448b, 448c, 448d, 448e, and 448f while reducing the size of the driving unit 400.

Referring to FIG. 9, the magnet frame 480 may include a magnet seating portion 486 on which the permanent magnet is disposed, a magnet coupling portion 482 extending radially inward from a rear of the magnet seating portion 486, and a plurality of magnet coupling holes 484 formed in the magnet coupling portion 482 and spaced apart from each other in the circumferential direction.

An imaginary line L2 connecting a central region of the magnet coupling portion 482 and the magnet coupling hole 484 may overlap the stator core 448 in the axial direction C. An imaginary line L2 connecting the central region of the magnet coupling portion 482 and the magnet coupling hole 484 may overlap a space between the plurality of permanent magnets 460a, 460b, 460c, 460d, 460e, 460f, 460g, 460h, 460i, 460j, 460k, and 460l in the axial direction C.

Through this, since the position of the permanent magnet 460 and the position of the stator core 448 can be determined according to the position of the magnet coupling hole 484 of the magnet frame 480, it is possible to improve the manufacturing efficiency of the driving unit 400.

In addition, the spring supporter 580 may include a supporter coupling portion 582 disposed at a rear of the magnet frame 480, a plurality of supporter coupling holes 584 formed in the supporter coupling portion 582 and spaced apart from each other in the circumferential direction, a plurality of supporter seating portions 586 extending radially from the supporter coupling portion 582 and in which the plurality of main front springs 900 are disposed, and a protrusion 588 protruding forward from the plurality of supporter seating portions 586 and disposed inside the main front spring 900.

An imaginary line L1 connecting a central region of the supporter coupling portion 582 and the supporter coupling hole 584 may overlap the stator cores 448 in the axial direction C. An imaginary line L2 connecting a central region of the supporter coupling portion 582 and the supporter coupling hole 584 may overlap a space between the plurality of permanent magnets 460a, 460b, 460c, 460d, 460e, 460f, 460g, 460h, 460i, 460j, 460k, and 460l in the axial direction C.

Through this, since the position of the permanent magnet 460 and the position of the stator core 448 can be determined according to the position of the supporter coupling hole 584 of the spring supporter 580, it is possible to improve the manufacturing efficiency of the driving unit 400.

Referring to FIG. 10, the plurality of main front springs 900 may overlap the stator core 448 in the axial direction. For example, the plurality of main front springs 900 may include the first stator core 448a, the third stator core 448c, the fourth stator core 448d, and the sixth stator core 448f in the axial direction. The plurality of main front springs 900 may overlap the curved portions 444b and 444d in the axial direction.

Through this, it is possible to maintain the overall balance of the linear compressor 100 while reducing the size of the driving unit 400.

Figure 11:
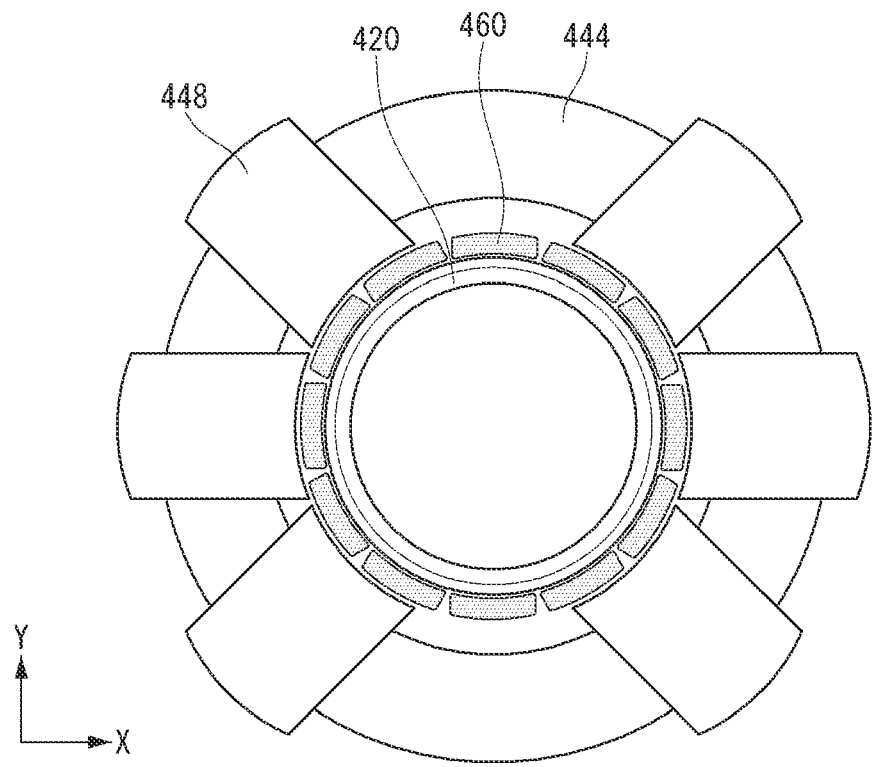
FIG. 11 is a front view of a driving unit of a linear compressor according to a second embodiment of the present disclosure.

FIG. 11 is a front view of a driving unit of a linear compressor according to a second embodiment of the present disclosure.

The detailed configuration of the driving unit 400 of the linear compressor 100 according to the second embodiment of the present disclosure, which is not described below, may be understood to be the same as the detailed configuration of the driving unit 400 of the linear compressor 100 according to the first embodiment of the present disclosure.

Referring to FIG. 11, the bobbin 444 of the driving unit 400 of the linear compressor 100 according to the second embodiment of the present disclosure may be formed in a cylindrical shape. That is, it may be understood that the straight portions 444a and 444c of the bobbin 444 according to the first embodiment are replaced with curved portions.

Figure 12:
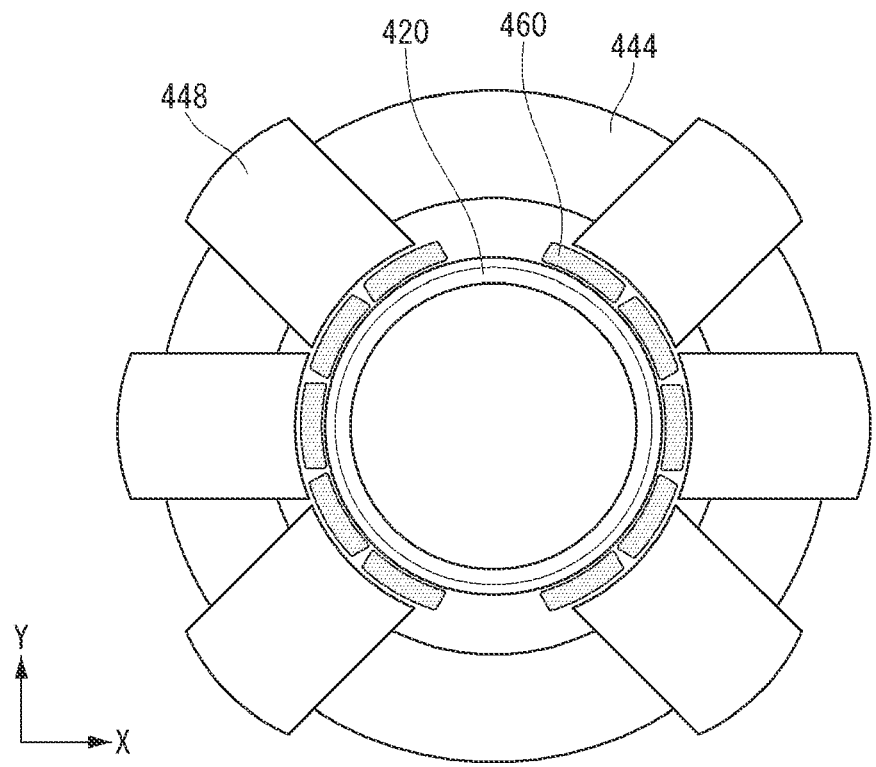
FIG. 12 is a front view of a driving unit of a linear compressor according to a third embodiment of the present disclosure.

FIG. 12 is a front view of a driving unit of a linear compressor according to a third embodiment of the present disclosure.

The detailed configuration of the driving unit 400 of the linear compressor 100 according to the third embodiment of the present disclosure, which is not described below, may be understood to be the same as the detailed configuration of the driving unit 400 of the linear compressor 100 according to the first embodiment of the present disclosure.

Referring to FIG. 12, the bobbin 444 of the driving unit 400 of the linear compressor 100 according to the third embodiment of the present disclosure may be formed in a cylindrical shape. That is, it may be understood that the straight portions 444a and 444c of the bobbin 444 according to the first embodiment are replaced with curved portions.

The permanent magnet 460 may include first to tenth permanent magnets spaced apart from each other in the circumferential direction. It may be understood that the first permanent magnet is disposed on the upper right side of FIG. 12, and the second to tenth permanent magnets are sequentially disposed in a clockwise direction with respect to the first permanent magnet.

In this case, an angle between a straight lines passing through the center of the first to fifth permanent magnets and the center of the inner stator 420 may be 30 degrees, respectively. An angle between a straight line passing through the center of the sixth permanent magnet and the center of the inner stator 420 and a straight line passing through the center of the seventh permanent magnet and the center of the inner stator 420 may be 60 degrees. An angle between a straight lines passing through the center of the seventh to tenth permanent magnets and the center of the inner stator 420 may be 30 degrees, respectively. An angle between a straight line passing through the center of the tenth permanent magnet and the center of the inner stator 420 and a straight line passing through the center of the first permanent magnet and the center of the inner stator 420 may be 30 degrees.

Through this, it is possible to reduce the cost by reducing the configuration of the driving unit 400 while maintaining a stable output of the driving unit 400.

The number and arrangement of the plurality of permanent magnets 460 according to the third embodiment of the present disclosure may be applied to the number and arrangement of the plurality of permanent magnets 460 according to the first embodiment of the present disclosure. In this case, the central regions of the first to tenth permanent magnets facing each other may face only the curved portions 444*b* and 444*d* and may not face the straight portions 444*a* and 444*c*.

Figure 13:
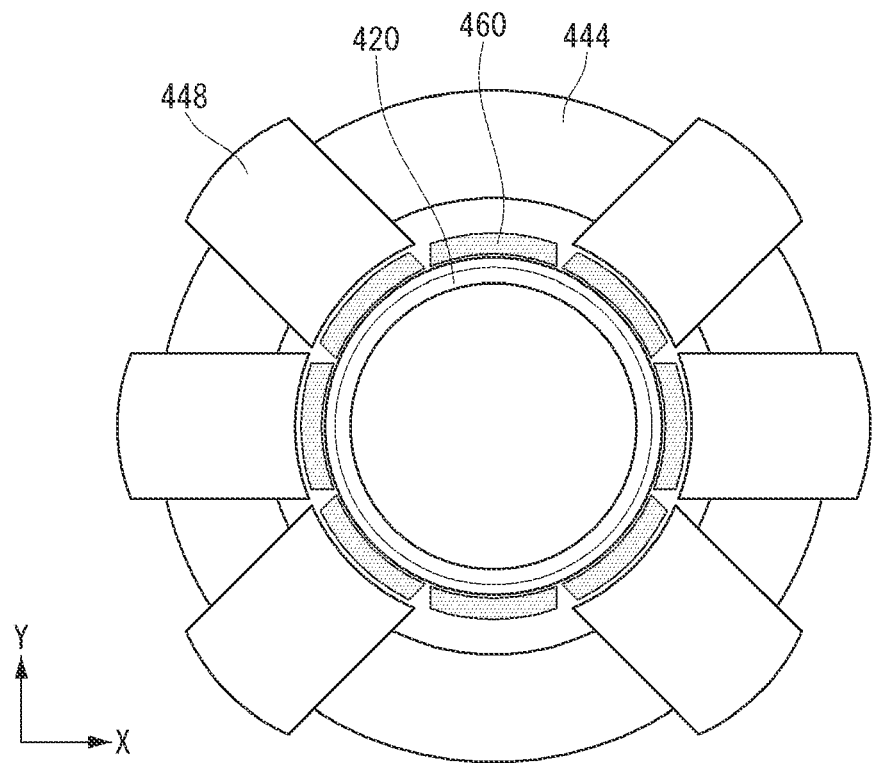
FIG. 13 is a front view of a driving unit of a linear compressor according to a fourth embodiment of the present disclosure.

FIG. 13 is a front view of a driving unit of a linear compressor according to a fourth embodiment of the present disclosure.

A detailed configuration of the driving unit 400 of the linear compressor 100 according to the fourth embodiment of the present disclosure, which is not described below, may be understood to be the same as a detailed configuration of the driving unit 400 of the linear compressor 100 according to the first embodiment of the present disclosure.

Referring to FIG. 13, the bobbin 444 of the driving unit 400 of the linear compressor 100 according to the fourth embodiment of the present disclosure may be formed in a cylindrical shape. That is, it may be understood that the straight portions 444*a* and 444*c* of the bobbin 444 according to the first embodiment are replaced with curved portions.

The permanent magnet 460 may include first to eighth permanent magnets spaced apart from each other at the same distance in the circumferential direction. It may be understood that the first permanent magnet is disposed in the upper portion of FIG. 13, and the second to tenth permanent magnets are sequentially disposed in a clockwise direction with respect to the first permanent magnet. The second to fourth permanent magnets and the sixth to eighth permanent magnets may face the stator core 448, respectively. The first permanent magnet and the fifth permanent magnet may not face the stator core 448.

Through this, it is possible to reduce the cost by reducing the configuration of the driving unit 400 while maintaining a stable output of the driving unit 400.

The number and arrangement of the plurality of permanent magnets 460 according to the fourth embodiment of the present disclosure may be applied to the number and arrangement of the plurality of permanent magnets 460 according to the first embodiment of the present disclosure. In this case, the first and fifth permanent magnets facing each other may face the straight portions 444*a* and 444*c*, and the second to fourth permanent magnets and the sixth to eighth permanent magnets may face the curved portions 444*b* and 444*d*.

Figure 14:
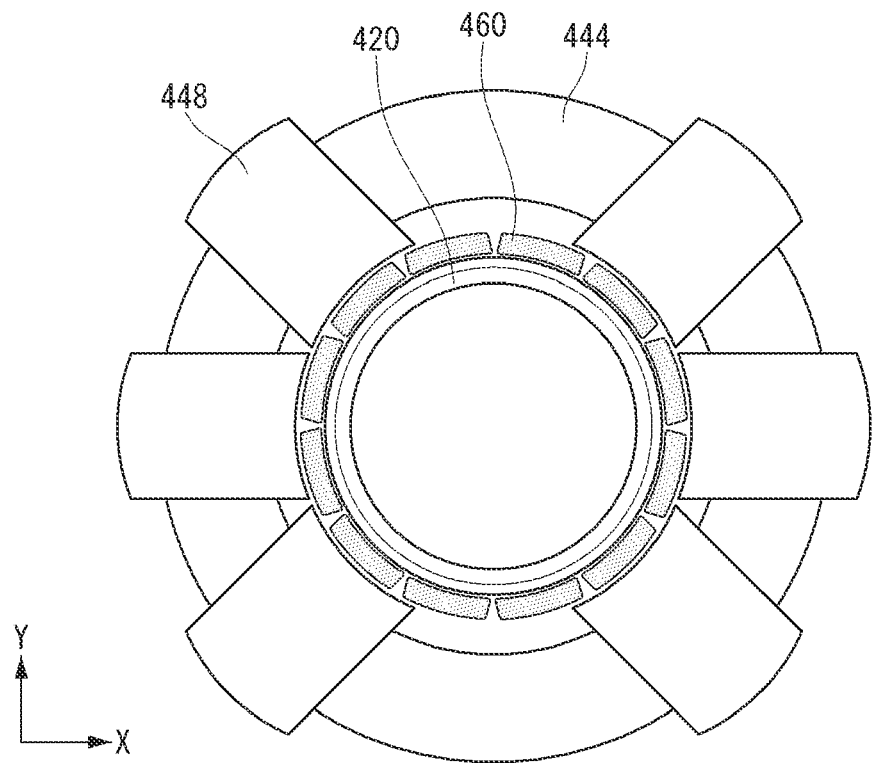
FIG. 14 is a front view of a driving unit of a linear compressor according to Comparative Example 1.

FIG. 14 is a front view of a driving unit of a linear compressor according to Comparative Example 1.

Referring to FIG. 14, the permanent magnet 460 of the driving unit according to Comparative Example 1 may consist of 12 pieces. It may be understood that the upper right permanent magnet is referred to as a first permanent magnet, and the second to twelfth permanent magnets are sequentially arranged in a clockwise direction with respect to the first permanent magnet. In this case, a vertical line passing through the center of the inner stator 420 may pass through the space between the first permanent magnet and the twelfth permanent magnet and pass through the space between the sixth permanent magnet and the seventh permanent magnet.

Figure 15:
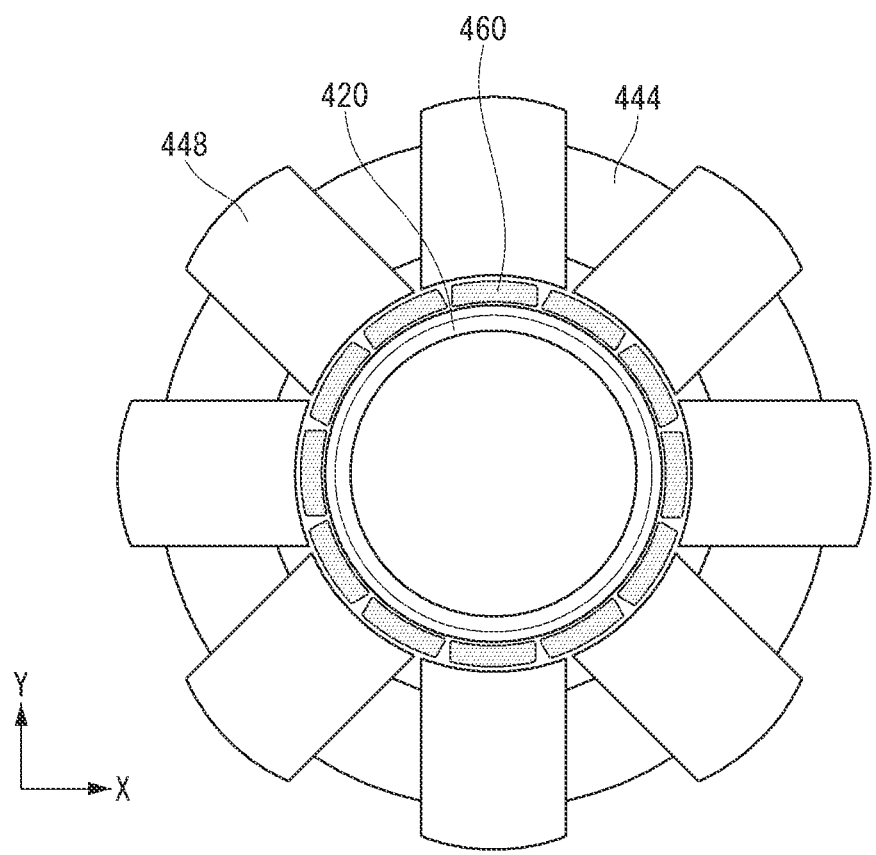
FIG. 15 is a front view of a driving unit of a linear compressor according to Comparative Example 2.

FIG. 15 is a front view of a driving unit of a linear compressor according to Comparative Example 2.

Referring to FIG. 15, the stator cores 448 of the driving unit according to Comparative Example 2 may be formed in eight pieces. It may be understood that two stator cores are added to the driving unit 400 according to the second embodiment of the present disclosure, and the plurality of stator cores are spaced apart from each other at equal intervals in the circumferential direction.

Figure 16:
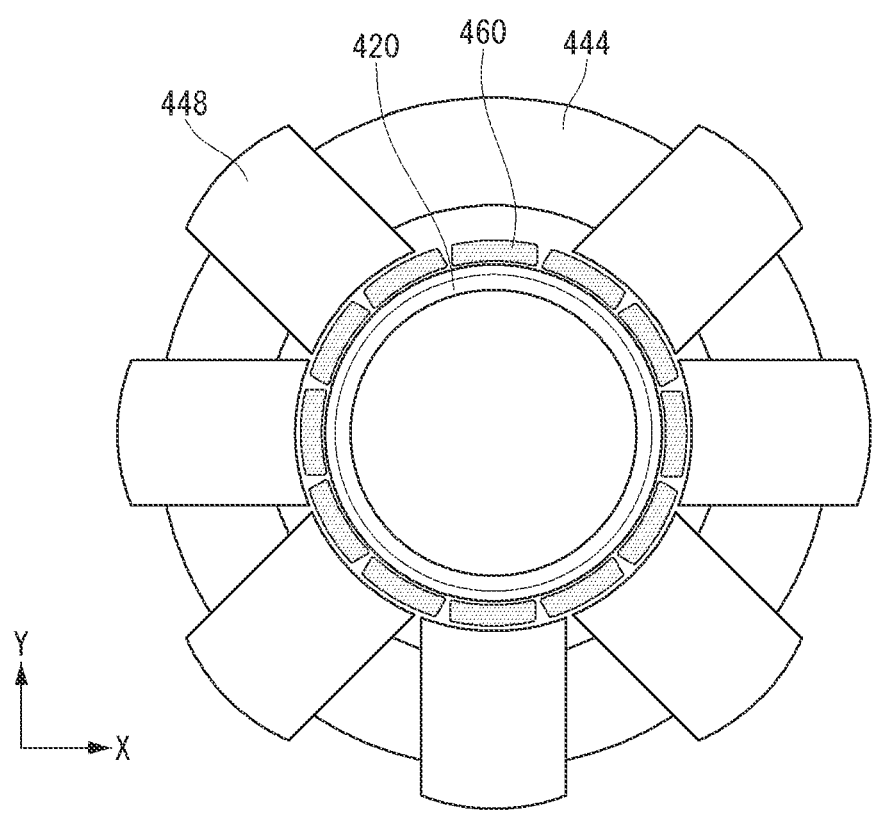
FIG. 16 is a front view of a driving unit of a linear compressor according to Comparative Example 3.

FIG. 16 is a front view of a driving unit of a linear compressor according to Comparative Example 3.

Referring to FIG. 16, the stator cores 448 of the driving unit according to Comparative Example 3 may be formed in seven pieces. It may be understood that the stator core disposed on the upper portion is deleted in the driving unit according to Comparative Example 3.

Figures 17, 18:
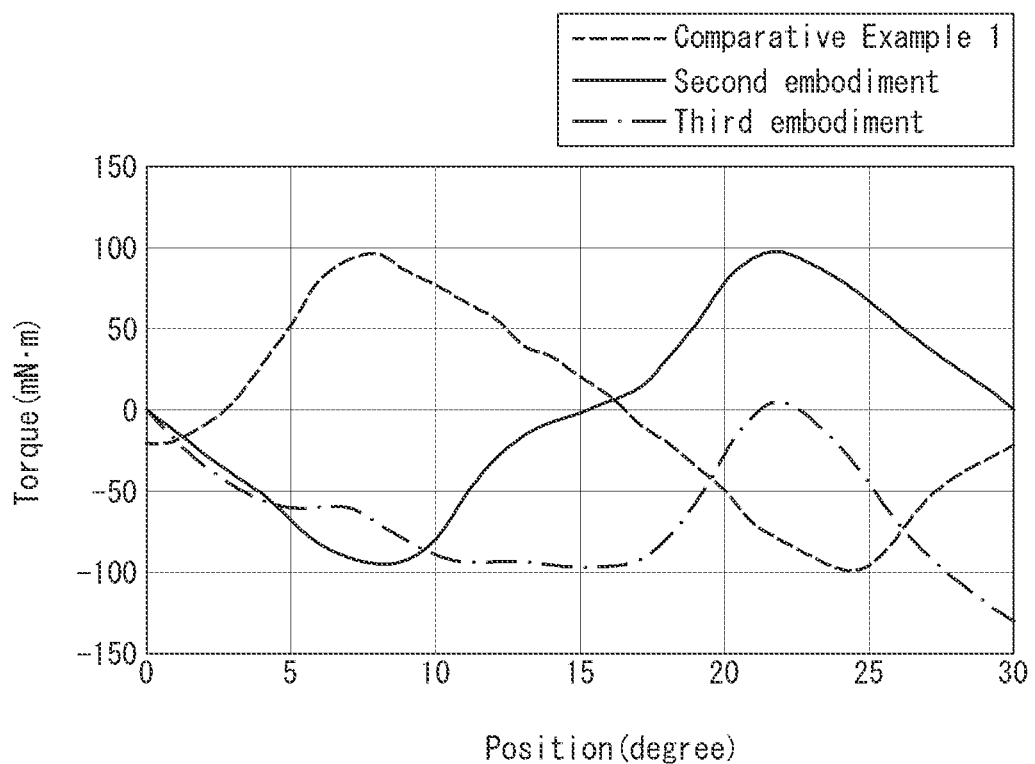
FIG. 17 is a graph of torque according to a rotational position of a driving unit of second and third embodiments and Comparative Example 1 of the present disclosure.
FIG. 18 is a table of a lateral force according to an eccentric position of second and third embodiments and Comparative Examples 2 and 3 of the present disclosure.

FIG. 17 is a graph of torque according to a rotational position of a driving unit of second and third embodiments and Comparative Example 1 of the present disclosure.

Referring to FIG. 17, when the permanent magnet 460 rotates counterclockwise, it represents the rotational torque generated in the permanent magnet 460. A positive rotational torque means that a rotational torque that rotates the permanent magnet 460 in a counterclockwise direction is generated, and a negative rotational torque means that a rotational torque that rotates the permanent magnet 460 in a clockwise direction is generated.

That is, a vertical line passing through the center of the inner stator 420 passes through a space between the first permanent magnet and the twelfth permanent magnet, and in the case of Comparative Example 1 passing through the space between the sixth permanent magnet and the seventh permanent magnet, when the permanent magnet 460, which is a mover, rotates, the permanent magnet 460 does not return to its original position, which may cause a problem.

In contrast, in the case of the driving unit 400 according to the second and third embodiments of the present disclosure, when the permanent magnet 460, which is a mover, rotates, a force to restore the permanent magnet 460 to its original position is generated to enable stable operation of the linear compressor 100. This also applies to the case of the driving unit 400 according to the first and fourth embodiments of the present disclosure.

FIG. 18 is a table of a lateral force according to an eccentric position of second and third Examples and Comparative Examples 2 and 3 of the present disclosure.

Referring to FIG. 18, when only one stator core is removed as in Comparative Example 3, it can be seen that a side force is greatly generated even when the eccentricity is 0. That is, in the case of Comparative Example 3, a problem may occur during operation of the linear compressor 100.

In addition, when a pair of stator cores 448 are removed as in the driving unit 400 according to the second and third embodiments of the present disclosure, it can be seen that there is no significant difference in the side force due to eccentricity from Comparative Example 2 having eight stator cores 448. That is, it can be seen that stable operation of the linear compressor 100 is possible even when the pair of stator cores 448 disposed at the upper and lower portions are removed. This also applies to the case of the driving unit 400 according to the first and fourth embodiments of the present disclosure. Through this, in the case of the driving unit 400 according to the first to fourth embodiments of the present disclosure, the manufacturing cost may be reduced by partially removing the configuration.

Some or other embodiments of the present disclosure described above are not exclusive or distinct from one another. Some or other embodiments of the present disclosure described above may be used in combination or combined with each configuration or function.

For example, it means that configuration A described in specific embodiments and/or drawings and configuration B described in other embodiments and/or drawings may be combined. In other words, even when the combination between the components is not described directly, it means that the combination is possible except when it is described as not possible to combine.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

What is claimed is:

1. A compressor driver comprising:
   an inner stator;
   a bobbin surrounding the inner stator in a circumferential direction;
   a coil wound around the bobbin;
   a plurality of stator cores surrounding the bobbin and spaced apart from each other in the circumferential direction; and
   a plurality of permanent magnets disposed between the inner stator and the plurality of stator cores,
   wherein the bobbin includes:
      a pair of straight portions positioned opposite to each other with respect to the inner stator, and
      a curved portion partially surrounding the inner stator and connecting the pair of straight portions to each other.

2. The compressor driver of claim 1, wherein the pair of straight portions are positioned at an upper region and a lower region of the bobbin.

3. The compressor driver of claim 1, wherein the plurality of stator cores are disposed only at the curved portion.

4. The compressor driver of claim 3, wherein the plurality of stator cores include a first stator core, a second stator core, a third stator core, a fourth stator core, a fifth stator core, and a sixth stator core that are spaced apart from each other in the circumferential direction,
   wherein an angle between a straight line passing through a center of the first stator core and a center of the inner stator and a straight line passing through a center of the second stator core and the center of the inner stator is 45 degrees,
   wherein an angle between the straight line passing through the center of the second stator core and the center of the inner stator and a straight line passing through a center of the third stator core and the center of the inner stator is 45 degrees,
   wherein an angle between the straight line passing through the center of the third stator core and the center of the inner stator and a straight line passing through a center of the fourth stator core and the center of the inner stator is 90 degrees,
   wherein an angle between the straight line passing through the center of the fourth stator core and the center of the inner stator and a straight line passing through a center of the fifth stator core and the center of the inner stator is 45 degrees,
   wherein an angle between the straight line passing through the center of the fifth stator core and the center of the inner stator and a straight line passing through a center of the sixth stator core and the center of the inner stator is 45 degrees, and
   wherein an angle between the straight line passing through the center of the sixth stator core and the center of the inner stator and the straight line passing through the center of the first stator core and the center of the inner stator is 90 degrees.

5. The compressor driver of claim 1, wherein the plurality of permanent magnets include a first permanent magnet, a second permanent magnet, a third permanent magnet, a fourth permanent magnet, a fifth permanent magnet, a sixth permanent magnet, a seventh permanent magnet, an eighth permanent magnet, a ninth permanent magnet, a tenth permanent magnet, an eleventh permanent magnet, and a twelfth permanent magnet that are equally spaced apart from each other in the circumferential direction,
   wherein the first permanent magnet and the seventh permanent magnet face each other and face at least one of the pair of straight portions,
   wherein a central region of each of the second permanent magnet, the third permanent magnet, the fourth permanent magnet, the fifth permanent magnet, and the sixth permanent magnet faces the curved portion, and
   wherein a central region of each of the eighth permanent magnet, the ninth permanent magnet, the tenth permanent magnet, the eleventh permanent magnet, and the twelfth permanent magnet faces the curved portion.

6. The compressor driver of claim 1, wherein the plurality of permanent magnets include a first permanent magnet, a second permanent magnet, a third permanent magnet, a fourth permanent magnet, a fifth permanent magnet, a sixth permanent magnet, a seventh permanent magnet, an eighth permanent magnet, a ninth permanent magnet, and a tenth permanent magnet that are spaced apart from each other in the circumferential direction, and
   wherein central regions of the first permanent magnet, the second permanent magnet, the third permanent magnet, the fourth permanent magnet, the fifth permanent magnet, the sixth permanent magnet, the seventh permanent magnet, the eighth permanent magnet, the ninth permanent magnet, and the tenth permanent magnet face each other and face the curved portion.

7. The compressor driver of claim 6, wherein an angle between a straight line passing through a center of the first permanent magnet and a center of the inner stator and a straight line passing through a center of the second permanent magnet and the center of the inner stator is 30 degrees,
   wherein an angle between a straight line passing through a center of the second permanent magnet and the center of the inner stator and a straight line passing through a center of the third permanent magnet and the center of the inner stator is 30 degrees,
   wherein an angle between a straight line passing through a center of the third permanent magnet and the center of the inner stator and a straight line passing through a center of the fourth permanent magnet and the center of the inner stator is 30 degrees,
   wherein an angle between a straight line passing through a center of the fourth permanent magnet and the center of the inner stator and a straight line passing through a center of the fifth permanent magnet and the center of the inner stator is 30 degrees, wherein an angle between a straight line passing through a center of the sixth permanent magnet and the center of the inner stator and a straight line passing through a center of the seventh permanent magnet and the center of the inner stator is 60 degrees, wherein an angle between a straight line passing through a center of the seventh permanent magnet and the center of the inner stator and a straight line passing through a center of the eighth permanent magnet and the center of the inner stator is 30 degrees, wherein an angle between a straight line passing through a center of the eighth permanent magnet and the center of the inner stator and a straight line passing through a center of the ninth permanent magnet and the center of the inner stator is 30 degrees, wherein an angle between a straight line passing through a center of the ninth permanent magnet and the center of the inner stator and a straight line passing through a center of the tenth permanent magnet and the center of the inner stator is 30 degrees, and wherein an angle between a straight line passing through the center of the tenth permanent magnet and the center of the inner stator and a straight line passing through the center of the first permanent magnet and the center of the inner stator is 30 degrees.

8. The compressor driver of claim 1, wherein the plurality of permanent magnets include a first permanent magnet, a second permanent magnet, a third permanent magnet, a fourth permanent magnet, a fifth permanent magnet, a sixth permanent magnet, a seventh permanent magnet, and an eighth permanent magnets that are equally spaced apart from each other in the circumferential direction, wherein the first permanent magnet and the fifth permanent magnet face each other and face at least one of the pair of straight portions, wherein the second permanent magnet, the third permanent magnet, and the fourth permanent magnet face the curved portion, and wherein the sixth permanent magnet, the seventh permanent magnet, and the eighth permanent magnet face the curved portion.

9. A linear compressor comprising:
a frame;
a cylinder coupled to the frame;
an inner stator disposed at an outer circumferential surface of the cylinder;
a bobbin surrounding the inner stator in a circumferential direction;
a coil wound around the bobbin;
a plurality of stator cores surrounding the bobbin and spaced apart from each other in the circumferential direction; and
a plurality of permanent magnets disposed between the inner stator and the plurality of stator cores,
wherein the bobbin includes:
a pair of straight portions positioned opposite to each other with respect to the inner stator, and
a curved portion partially surrounding the inner stator and connecting the pair of straight portions to each other.

10. The linear compressor of claim 9, further comprising:
an oil feeder coupled to the frame,
wherein the pair of straight portions overlaps the oil feeder in an axial direction.

11. The linear compressor of claim 10, wherein a part of the oil feeder is disposed between the plurality of stator cores.

12. The linear compressor of claim 9, further comprising:
a terminal portion coupled to the frame and electrically connected to the coil, and
wherein the pair of straight portions overlaps the terminal portion in an axial direction.

13. The linear compressor of claim 12, wherein a part of the terminal portion is disposed between the plurality of stator cores.

14. The linear compressor of claim 9, further comprising:
a stator cover supporting rear surfaces of the plurality of stator cores;
a magnet frame supporting the plurality of permanent magnets;
a spring supporter coupled to the magnet frame; and
a plurality of main front springs having (i) a front portion disposed at a rear surface of the stator cover and (ii) a rear portion disposed at the spring supporter,
wherein the plurality of main front springs overlap the plurality of stator cores in an axial direction.

15. The linear compressor of claim 14, wherein the magnet frame includes:
a magnet seating portion supporting the plurality of permanent magnets;
a magnet coupling portion extending radially inward from a rear of the magnet seating portion; and
a plurality of magnet coupling holes defined at the magnet coupling portion and spaced apart from each other in the circumferential direction, and
wherein an imaginary line connecting a central region of the magnet coupling portion and the magnet coupling hole overlaps the plurality of stator cores in the axial direction.

16. The linear compressor of claim 14, wherein the magnet frame includes:
a magnet seating portion supporting the plurality of permanent magnets;
a magnet coupling portion extending radially inward from a rear of the magnet seating portion; and
a plurality of magnet coupling holes defined at the magnet coupling portion and spaced apart from each other in the circumferential direction, and
wherein an imaginary line connecting a central region of the magnet coupling portion and the magnet coupling hole overlaps a space between the plurality of permanent magnets in the axial direction.

17. The linear compressor of claim 14, wherein the spring supporter includes:
a supporter coupling portion disposed at a rear of the magnet frame;
a plurality of supporter coupling holes defined at the supporter coupling portion and spaced apart from each other in the circumferential direction, and
a plurality of supporter seating portions extending radially from the supporter coupling portion and supporting the plurality of main front springs, and
wherein an imaginary line connecting a central region of the supporter coupling portion and the supporter coupling hole overlaps the plurality of stator cores in the axial direction.

18. The linear compressor of claim 14, wherein the spring supporter includes:
a supporter coupling portion disposed at a rear of the magnet frame;
a plurality of supporter coupling holes defined at the supporter coupling portion and spaced apart from each other in the circumferential direction; and a plurality of supporter seating portions extending radially from the supporter coupling portion and supporting the plurality of main front springs, and wherein an imaginary line connecting a central region of the supporter coupling portion and the supporter coupling hole overlaps a space between the plurality of permanent magnets in the axial direction.

19. The linear compressor of claim 9, wherein the pair of straight portions are positioned at an upper region and a lower region of the bobbin.

20. The linear compressor of claim 9, wherein the plurality of stator cores are disposed only at the curved portion.

* * * * *